United States Patent
Kim et al.

(10) Patent No.: US 12,244,367 B2
(45) Date of Patent: Mar. 4, 2025

(54) RADIO TRANSMISSION OR RECEPTION APPARATUS AND BEAM FORMING METHOD THEREOF

(71) Applicant: KMW INC., Hwaseong-si (KR)

(72) Inventors: Duk Yong Kim, Yongin-si (KR); Young Chan Moon, Suwon-si (KR); Joon Hyong Shim, Yongin-si (KR); Min Seon Yun, Anyang-si (KR); Tea Youl Oh, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 18/143,058

(22) Filed: May 3, 2023

(65) Prior Publication Data

US 2023/0275623 A1    Aug. 31, 2023

Related U.S. Application Data

(63) Continuation of application No. PCT/KR2021/015936, filed on Nov. 4, 2021.

(30) Foreign Application Priority Data

Nov. 4, 2020  (KR) .......... 10-2020-0145980
Nov. 4, 2021  (KR) .......... 10-2021-0150724

(51) Int. Cl.
*H04B 7/10*     (2017.01)
*H04B 1/00*     (2006.01)
(Continued)

(52) U.S. Cl.
CPC ......... *H04B 7/0408* (2013.01); *H04B 1/0096* (2013.01); *H04B 7/043* (2013.01)

(58) Field of Classification Search
CPC ... H04W 16/28; H04W 24/10; H04W 72/046; H04W 76/27; H04W 72/542; H04B 7/10;
(Continued)

(56) References Cited

U.S. PATENT DOCUMENTS 6,784,845 B1 *   8/2004  Rausch ............... H04B 7/10
                                                   343/702
10,971,815 B1 *  4/2021  West .................. H01Q 21/24
(Continued)

FOREIGN PATENT DOCUMENTS

JP    2000-049524 A    2/2000
JP    2003-060424 A    2/2003
(Continued)

OTHER PUBLICATIONS

International Search Report mailed Feb. 8, 2022 for International Application No. PCT/KR2021/015936 and its English translation.
(Continued)

*Primary Examiner* — Eva Y Puente
(74) *Attorney, Agent, or Firm* — Insight Law Group, PLLC; Seung Lee

(57) ABSTRACT

The present disclosure relates to a radio transmission or reception apparatus and a beam forming method thereof. The apparatus according to the present disclosure comprises: an array antenna for forming multiple beams having different directivities so as to transmit or receive signals through the multiple beams; a digital unit for synthesizing an orthogonal polarization pair so as to generate multi-beam signals for forming the multiple beams; and an RF unit for frequency-converting the multi-beam signals so as to output each of the frequency converted multi-beam signals to the array antenna.

20 Claims, 18 Drawing Sheets

(51) Int. Cl.
*H04B 7/0408* (2017.01)
*H04B 7/0426* (2017.01)

(58) Field of Classification Search
CPC .. H04B 7/0617; H04B 7/0413; H04B 7/0626; H04B 7/0456; H04B 7/0639; H04B 7/0469; H04B 7/0478; H04B 7/0695; H04L 5/0048; H04L 5/0023; H04L 9/0858; H04L 9/0852; H04L 5/0053; H04L 5/0051; H04L 5/005; H04L 5/0057
USPC ........................................................ 375/262
See application file for complete search history.

(56) References Cited

U.S. PATENT DOCUMENTS

| | | | |
|---|---|---|---|
| 11,089,595 B1* | 8/2021 | Frigon | H01Q 21/065 |
| 11,817,932 B2* | 11/2023 | Oh | H04B 7/0691 |
| 12,000,953 B2* | 6/2024 | Vollbracht | G01S 7/354 |
| 2016/0337056 A1* | 11/2016 | Frenne | H04W 24/10 |
| 2016/0380690 A1 | 12/2016 | Jidhage | |
| 2022/0069927 A1* | 3/2022 | Abdelmonem | H04B 17/336 |
| 2023/0179276 A1* | 6/2023 | Petersson | H01Q 21/24 375/262 |

FOREIGN PATENT DOCUMENTS

| | | |
|---|---|---|
| JP | 2009-225013 A | 10/2009 |
| JP | 2010-233215 A | 10/2010 |
| JP | 2011-521592 A | 7/2011 |
| JP | 2014-027608 A | 2/2014 |
| JP | 2015-080077 A | 4/2015 |
| JP | 2020-503709 A | 1/2020 |
| KR | 10-2013-0053797 A | 5/2013 |
| KR | 10-2015-0137612 A | 12/2015 |
| KR | 10-2016-0032144 A | 3/2016 |
| KR | 10-2017-0041115 A | 4/2017 |
| KR | 10-2019-0037083 A | 4/2019 |
| WO | 2018-226764 A1 | 12/2018 |

OTHER PUBLICATIONS

Non-final Office Action mailed Oct. 14, 2022 mailed from the Korean Intellectual Property Office for Korean Application No. 10-2021-0150724.

Park, Jaehyun et al. Multi-User Linear Precoding for Multi-Polarized Massive MIMO System Under Imperfect CSIT. fu: IEEE Transactions on Wireless Communications. Jan. 6, 2015, vol. 14, Issue 5, pp. 2852532, E-ISSN: 1558-2248.

Non-final Office Action mailed on May 21, 2024 from the Japanese Patent Office for Japanese Application No. 2023-527052.

Extended European Search Report dated Sep. 26, 2024 for European Application No. 21889595.1.

* cited by examiner

RADIO TRANSMISSION OR RECEPTION APPARATUS AND BEAM FORMING METHOD THEREOF

CROSS-REFERENCE TO RELATED APPLICATIONS

This application is a continuation application of International Application No. PCT/KR2021/015936, filed Nov. 4, 2021, which claims the benefit of Korean Patent Application Nos. 10-2020-0145980, filed Nov. 4, 2020; and 10-2021-0150724, filed Nov. 4, 2021, in the Korean Intellectual Property Office, the disclosures of which are incorporated herein in their entirety by reference.

TECHNICAL FIELD

The present disclosure relates to a radio transmission and reception apparatus and a beam forming method thereof, and more specifically, to a radio transmission and reception apparatus and method having multiple beams in which heterogeneous orthogonal polarization pairs intersect.

BACKGROUND ART

Multiple-input multiple-output (MIMO) antenna modules of mobile communication are generally designed to have a plurality of dual polarization antenna module (dual polarization antenna module array) to reduce a fading effect due to multiple paths and perform a polarization diversity function.

The fading effect refers to a phenomenon in which an intensity of a radio wave varies over time, and the diversity refers to a method of reducing the fading effect by synthesizing several reception signals with different intensities of electric fields or signal output to noise output ratios to obtain a single signal.

Beams radiated from the dual polarization antenna have a wide beam form, and beams having the wide beam form have a limitation that it is difficult to transmit a signal to a distant point because a signal to noise ratio (SNR) is reduced by a surrounding environment.

The problem was conventionally tried to be solved by coupling radiation elements in the dual polarization antenna module array (by sharing a signal path) and separating a space (sector) for signals having the same frequency (signals having the same polarization).

However, in such a method, since beams having the same polarization are disposed at positions adjacent to each other, there is a problem in that a correlation between the beams may increase, thereby degrading communication quality.

As described above, in the massive MIMO systems using the multiple beams, there is a problem in that a correlation coefficient of a radio channel increases due to interference between adjacent beams, thereby degrading signal transmission and reception efficiency of an antenna. Furthermore, there is a problem in that a capacity of a cell is restricted due to the interference between the beams.

Recently, antenna modules having different polarizations are employed in the massive MIMO systems and configured so that adjacent beams use different polarizations, thereby reducing the interference between the adjacent beams. However, this method has a problem that a lot of time and money are consumed because it is necessary to separately constitute an antenna module for each of polarizations to be used and thus a manufacturing process is complicated.

In addition, this method may also have a problem of increasing a size of the antenna because it is necessary to separately constitute the antenna module for each polarization to be used.

DISCLOSURE

Technical Problem

The present disclosure has been made in efforts to solve the problems and is directed to providing a radio transmission and reception apparatus and a beam forming method thereof, which provide an orthogonal polarization pair to each of multiple beams generated in a cell or a sector and provide a heterogeneous orthogonal polarization pair rather than a homogeneous polarization pair between adjacent beams, thereby minimizing interference between the beams and thus increasing antenna efficiency and a capacity of the cell.

In addition, the present disclosure is directed to providing a radio transmission and reception apparatus and a beam forming method thereof, which separate fixed beams within one cell or sector to have different directions to expand a coverage and radiate narrow beams to improve a gain of an antenna.

Objects of the present disclosure are not limited to the above-described objects, and other objects that are not mentioned will be able to be clearly understood by those skilled in the art from the following description.

Technical Solution

In order to achieve the objects, a radio transmission and reception apparatus according to one embodiment of the present disclosure includes an array antenna configured to form multiple beams having different directivities and transmit and receive signals through the multiple beams, a digital unit configured to synthesize orthogonal polarization pairs and generate multi-beam signals for forming the multiple beams, and a radio frequency (RF) unit configured to frequency-convert the multi-beam signals and output each of signals to the array antenna.

The digital unit allocates heterogeneous orthogonal polarization pairs to adjacent beams among the multiple beams and differently sets phases of the orthogonal polarization pair allocated to each beam.

Each of the multiple beams may have a different directivity in vertical and horizontal directions.

The digital unit may include a polarization synthesizing unit configured to synthesize the orthogonal polarization pairs from the heterogeneous polarization signals, a polarization allocation unit configured to allocate the orthogonal polarization pair to each beam, and a multi-beam forming unit configured to generate beam signals for forming the multiple beams in the array antenna based on the orthogonal polarization pair allocated to each beam.

The polarization synthesizing unit may convert polarization of an input signal into a first orthogonal polarization pair and a second orthogonal polarization pair.

The first orthogonal polarization pair may be any one of a ±45 degree orthogonal polarization pair or a vertical/horizontal orthogonal polarization pair.

The second orthogonal polarization pair may be any one of a ±45 degree orthogonal polarization pair or a vertical/horizontal orthogonal polarization pair.

The polarization allocation unit may allocate the synthesized first orthogonal polarization pair and second orthogonal polarization pair to each beam.

The polarization allocation unit may allocate the first orthogonal polarization pair to a first beam among the beams, and allocate the second orthogonal polarization pair to a second beam adjacent to the first beam.

The digital unit may further include a polarization allocation control unit configured to generate a polarization allocation control signal for each beam according to the number of beams and a polarization component of a reference beam and provide the polarization allocation control signal to the polarization allocation unit.

The digital unit may further include a magnitude/phase correction unit configured to correct the magnitudes and phases of the orthogonal polarization pairs allocated to the beam signals.

The digital unit may further include a polarization synthesis calibration unit configured to compare the magnitudes and phases of the orthogonal polarization pairs allocated to the beam signals during polarization synthesis with the magnitudes and phases of the RF chains of the RF unit to determine the correction of the magnitudes and phases, and output correction signals to the magnitude/phase correction unit.

The digital unit may include a multi-beam forming unit configured to generate beam signals for forming the multiple beams in the array antenna, a polarization synthesizing unit configured to synthesize the beam signals and the heterogeneous orthogonal polarization pairs, and a polarization allocation unit configured to allocate any one of the orthogonal polarization pairs synthesized to the beam signals to each beam signal.

In addition, in order to achieve the object, a radio transmission and reception apparatus according to another embodiment of the present disclosure includes an array antenna configured to form multiple beams having different directivities and transmit and receive signals through the multiple beams, a digital unit configured to synthesize orthogonal polarization pairs to an input signal, allocate any one of the orthogonal polarization pairs to each beam, and allocate heterogeneous orthogonal polarization pairs to adjacent beams, and an RF unit configured to frequency-convert a polarization signal of the orthogonal polarization pair allocated to each beam, and set a phase of each polarization signal to output a beam signal to the array antenna.

The RF unit includes a plurality of RF chains configured to convert a frequency of each polarization signal, and a multi-beam forming unit configured to differently set the phase of each polarization signal to generate an analog multi-beam signal.

Meanwhile, in order to achieve the object, a beam forming method of a radio transmission and reception apparatus according to one embodiment of the present disclosure includes synthesizing orthogonal polarization pairs and generating multi-beam signals for forming multiple beams, frequency-converting the multi-beam signals through RF chains and outputting each of the multi-beam signals to an array antenna, and forming multiple beams having different directivities from the multi-beam signals in the array antenna.

Among the multiple beams, heterogeneous orthogonal polarization pairs are allocated to adjacent beams, and phases of the orthogonal polarization pair allocated to each beam are differently set.

Advantageous Effects

According to the radio transmission and reception apparatus and the beam forming method thereof according to the present disclosure, it is possible to provide the orthogonal polarization pair to each of multiple beams formed in the cell or the sector and provide the heterogeneous orthogonal polarization pair rather than the homogeneous polarization pair between adjacent beams, thereby minimizing the interference between the beams and increasing antenna efficiency and the capacity of the cell.

In addition, according to the present disclosure, it is possible to separate fixed beams within one cell or sector to have different directions to expand the coverage and radiate narrow beams to improve the gain of the antenna.

MODE FOR INVENTION

Figure 1:
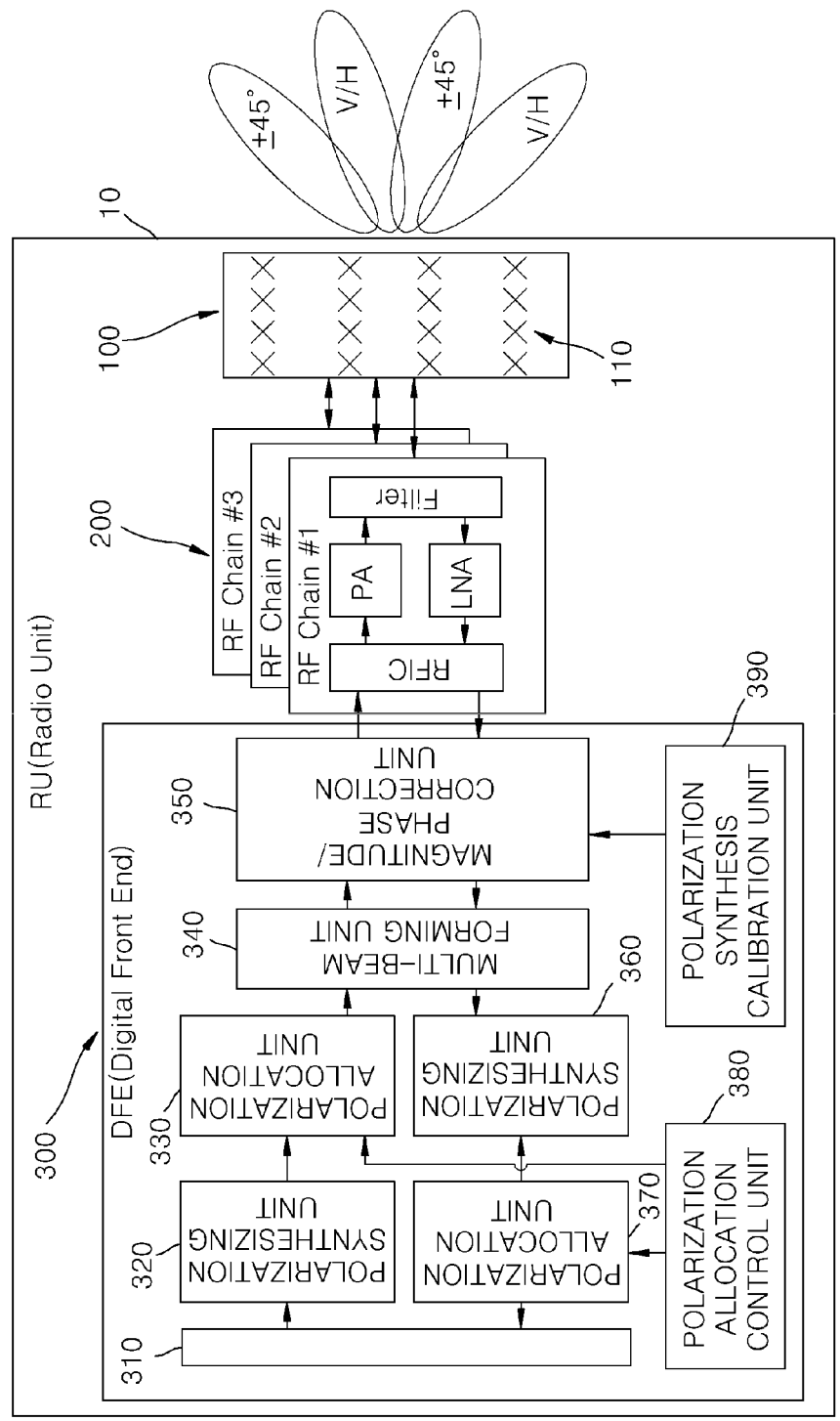
FIG. 1 is a view illustrating a configuration of a radio transmission and reception apparatus according to a first embodiment of the present disclosure.

Hereinafter, some embodiments of the present disclosure will be described in detail with reference to exemplary drawings. In adding reference numerals to components in each drawing, it should be noted that the same components have the same reference numerals as much as possible even when they are illustrated in different drawings. In addition, in describing embodiments of the present disclosure, the detailed description of related known configurations or functions will be omitted when it is determined that the detailed description obscures the understanding of the embodiments of the present disclosure.

The terms, such as first, second, A, B, (a), and (b) may be used to describe components of the embodiments of the present disclosure. The terms are only for the purpose of distinguishing one component from another, and the nature, sequence, order, or the like of the corresponding components is not limited by the terms. In addition, unless otherwise defined, all terms (including technical and scientific terms) used herein have the same meanings as those commonly understood by those skilled in the art to which the present disclosure pertains. The terms defined in a generally used dictionary should be construed as meanings that match with the meanings of the terms from the context of the related technology and are not construed as an ideal or excessively formal meaning unless clearly defined in this application.

The present disclosure relates to a radio transmission and reception apparatus and method, and the radio transmission and reception apparatus according to the present disclosure may be applied to a massive multiple-input and multiple-output (MIMO) system using multiple beams.

FIG. 1 is a view illustrating a configuration of a radio transmission and reception apparatus according to a first embodiment of the present disclosure.

Referring to FIG. 1, a radio transmission and reception apparatus 10 may include an array antenna 100, a radio frequency (RF) unit 200, and a digital unit 300.

The array antenna 100 is formed of a plurality of antenna modules 110. Here, the array antenna 100 is an antenna having each of a plurality of antenna modules 110 arranged at a predetermined position according to a predetermined pattern and configured to radiate beams in a predetermined direction by adjusting a phase, a magnitude, etc. according to the arrangement position of each antenna module 110. In this case, the array antenna 100 may form multiple beams according to a beam forming control signal generated by the RF unit 200 or the digital unit 300.

Each antenna module 110 may form multiple beams having different directivities in a vertical or horizontal direction within a cell coverage. Therefore, each antenna module 110 may be dynamically configured to perform transmission or reception in a specific beam direction.

Each antenna module 110 may be composed of two or two or more radiation elements having different polarization directions.

For example, the antenna module 110 may be a dual polarization antenna module composed of two radiation elements having orthogonal polarization directions.

Here, the dual polarization antenna module may be configured to include a first radiation element having a of +45 degree polarization direction and a second radiation element having a of −45 degree polarization direction orthogonal to (or vertical to) the polarization direction of the first radiation element.

Meanwhile, the dual polarization antenna module may be configured to include a third radiation element having a vertical polarization direction and a fourth radiation element having a horizontal polarization direction orthogonal to (or vertical to) the polarization direction of the third radiation element.

As another example, the antenna module 110 may be a quadruple polarization antenna module (or a quad polarization antenna module) composed of four radiation elements having orthogonal polarization directions.

Here, the quadruple polarization antenna module may be configured to include a first radiation element having a +45 degree polarization direction, a second radiation element having a −45 degree polarization direction orthogonal (or vertical) to the polarization direction of the first radiation element, a third radiation element having a vertical polarization direction, and a fourth radiation element having a horizontal polarization direction orthogonal to (or vertical to) the polarization direction of the third radiation element. In this case, the third radiation element and/or the fourth radiation element may have a polarization direction difference of ±45 degrees from the first radiation element and/or the second radiation element.

Beams radiated through the quadruple polarization antenna module may have a narrow beam shape, and beams adjacent to each other among these beams may have different orthogonal polarization directions.

Here, "orthogonal" or "vertical" may include both a case in which the polarization directions of the radiation elements accurately have an angle difference of 90 degrees and a case in which the polarization directions of the radiation elements have an angle difference of 90±θ. θ may vary depending on errors in a manufacturing process of the antenna module 110, a degree of a correlation with other antenna modules, a necessity to adjust a beam forming direction, etc.

The radiation elements constituting the antenna module 110 may be disposed in various forms within a region in which the antenna module 110 is configured.

For example, the radiation elements constituting the antenna module 110 may be disposed to be spaced apart from each other.

As another example, the radiation elements constituting the antenna module 110 may be disposed so that centers of some or all of the radiation elements intersect each other. In this case, areas occupied by the radiation elements in the antenna module 110 can be reduced, thereby increasing the area efficiency of the entire antenna module.

As described above, the increase in the area efficiency of the antenna module 110 may lead to an improvement in convenience according to manufacturing, installation, maintenance, etc. of the antenna.

Beams formed by each antenna module 110 are formed by at least two orthogonal polarization pairs orthogonal to each other, and orthogonal polarization pairs of beams adjacent to each other may be formed of different types (directions) of orthogonal polarizations.

For example, a first beam among the plurality of beams may be formed of a first type orthogonal polarization pair. Here, the first type orthogonal polarization pair may be a polarization pair composed of a +45 degree polarization signal and a −45 degree polarization signal.

Meanwhile, at least one second beam adjacent to the first beam may be formed of a second type orthogonal polarization pair. Here, the second type orthogonal polarization pair may be a polarization pair composed of a vertical polarization signal and a horizontal polarization signal.

As described above, according to the present disclosure, by applying different types (heterogeneous) orthogonal polarization pairs to adjacent beams in forming the multiple beams, it is possible to reduce the correlation between the adjacent beams, thereby improving communication quality. Here, different types of orthogonal polarization pairs may be applied to adjacent beams both in the horizontal direction and in the vertical direction. As described above, by applying the orthogonal polarization pairs, it is possible to improve the orthogonality of a radio channel, thereby increasing a capacity of a channel of a radio transmission and reception system.

For example, as an antenna system for forming beams using multiple polarizations, a method of forming beams so that antenna modules for forming beams in the same sector form one beam for each module and each beam has the same polarization component or one polarization component may be considered.

In contrast, in the present disclosure, in forming multiple beams having heterogeneous polarizations, each antenna module for forming beams in the same sector forms a pair of beams having a pair of polarization signals (e.g., ±45 degrees orthogonal polarization signals) orthogonal to each other for each module. That is, one antenna module generates two beams with respect to two polarization signals (e.g., ±45 degree orthogonal polarization signals), wherein a +45 degree polarization signal is allocated to one of the two beams, and a −45 degree polarization signal is allocated to the other. As described above, since the pair of polarization signals are set to have different phases and thus the beams are spatially separated, it is possible to minimize the interference between the beams.

In addition, since an antenna module adjacent to the antenna module forming the pair of beams having a pair of ±45 degree orthogonal polarization signals forms a pair of beams having the other pair of polarization signals (V/H orthogonal polarization signals) having no interference with the ±45 degree orthogonal polarization signals, it is also possible to minimize interference between beams of adjacent antenna modules.

In addition, referring to FIG. 1, the beams having the pair of ±45 degree orthogonal polarization signals and the beams having the other pair of homogeneous ±45 degree orthogonal polarization signals may be completely separated spatially, there is an advantage in that it is also possible to minimize interference between beams having the homogeneous polarization.

The RF unit 200 may include a plurality of RF chains 210. In this case, the RF chain 210 may be configured to include a filter, a power amplifier (PA), a low noise amplifier (LNA), and an RFIC. The RFIC may be configured to include a digital to analog converter (DAC)/analog to digital converter (ADC), a mixer, etc.

The RF chain 210 adjusts a signal to a signal suitable for transmission using a radio frequency antenna or converts a signal received through the array antenna 100 into a signal suitable for sampling and baseband processing.

Although not illustrated in FIG. 1, the RF unit 200 may include an analog type multi-beam forming unit. When the RF unit 200 includes the analog type multi-beam forming unit, the multi-beam forming unit of the digital unit 300 may be omitted. For a detailed description thereof, reference will be made to an embodiment of FIG. 15 to be described below.

Here, the multi-beam forming according to the present disclosure basically uses a digital beam forming technique.

Analog beam forming is a method of branching an analog signal that has undergone digital signal processing into multiple paths and forming beams through the settings of a phase shifter (PS) and the PA in each path and has a structure of a transmission and reception system composed of a plurality of phase shifters and signal dampers together with one RF chain. The analog beam forming is a method of forming a direction and shape of the beam by changing each of phases and amplitude values of the phase shifter and the signal damper connected to each individual antenna. The analog beam forming technique is vulnerable in terms of system performance and economics due to limited characteristics and an expensive component price problem of the phase shifter and is a form inconsistent with spatial multiplexing transmission technique for high capacity.

In contrast, the digital beam forming is a technique of forming beams at a digital stage using baseband processing of a base station in order to maximize diversity and a multiplexing gain. In addition, in the digital beam forming, the RF chain is connected to each individual antenna and RF circuits such as a phase shifter or a signal damper are not used, and the digital beam forming technique based on such a system structure changes a phase and amplitude of a signal through digital signal processing in the baseband rather than changing the phase and amplitude of the signal at an RF stage.

Here, the multi-beam forming according to the present disclosure is characterized in that the digital beam forming is implemented in a radio unit (RU) rather than a digital unit (DU) of the antenna system, and a detailed description thereof will be described below.

Meanwhile, although the RF unit 200 and the array antenna 100 are each illustrated in the embodiment of FIG. 1, the array antenna 100 may also be implemented in a form included in the RF unit 200.

A digital unit (DU) 300 may include an interface unit 310, polarization synthesizing units 320 and 360, polarization allocation units 330 and 370, a multi-beam forming unit 340, a magnitude/phase correction unit 350, a polarization allocation control unit 380, and a polarization synthesis calibration unit 390. Here, the DU 300 may be implemented as a digital front end (DFE) of a radio unit (RU) or in the form of some units included therein.

In a general digital beamforming, the digital unit of the antenna system performs all operations related to beam forming, while the radio transmission and reception apparatus 10 according to the present disclosure not only performs the beam forming performed by the digital device of the antenna system, but also allows the RU to perform operations such as polarization synthesis and allocation.

Here, since the RU may not distinguish users, it is characterized by forming the same beam for all users in a sector without forming a different beam for each user. Meanwhile, in the DU 300, a position of the multi-beam forming unit 340 may be configured differently as in [Embodiment 1] of FIG. 1 or [Embodiment 2] of FIG. 12.

Embodiment 1

According to the embodiment of FIG. 1, the interface unit 310 serves to receive a signal from a device connected to the radio transmission and reception apparatus 10 or output (transmit) a signal to the radio transmission and reception apparatus. Here, the interface unit 310 may be a fronthaul interface for connecting the radio transmission and reception apparatus 10 to a DU of a base station.

As examples of the fronthaul interface, there may be a common public radio interface (CPRI), an enhanced CPRI (eCPRI), etc.

A transmission signal processing unit and a reception signal processing unit may be disposed in each of the polarization synthesizing unit 320 and the polarization allocation unit 330. In this case, placement positions and orders of the transmission signal processing unit and the reception signal processing unit may be different.

A beam forming operation will be described based on the operation of processing the transmission signal as follows.

The polarization synthesizing unit 320 performs polarization synthesis after extracting four orthogonal polarization components based on input signals. At this time, the polarization synthesizing unit 320 may synthesize orthogonal polarization pairs and apply the synthesized orthogonal polarization pairs to the polarization allocation unit 330.

For a detailed description of the operation of extracting the four orthogonal polarization components in the polarization synthesizing unit 320, reference will be made to the embodiments of FIGS. 2 and 3. Here, the embodiments of FIGS. 2 and 3 will be described assuming that each antenna module 110 of the array antenna 100 is a dual polarization antenna module.

Figure 2:
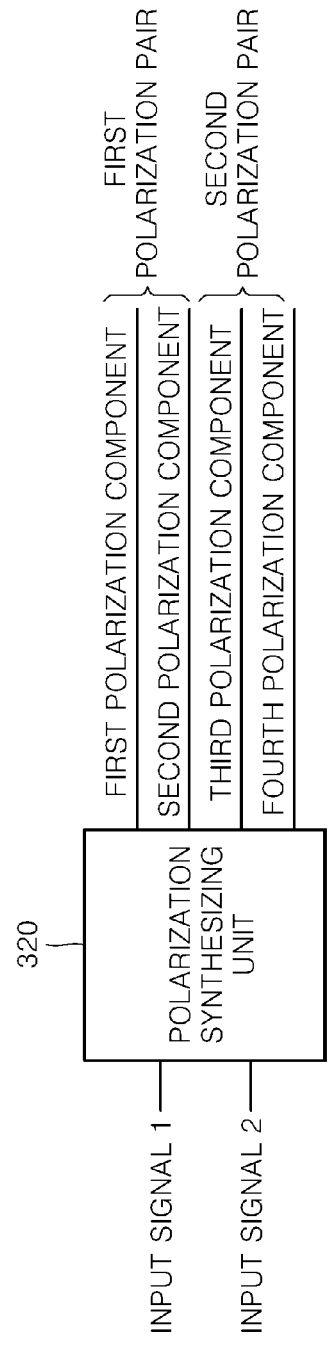
FIGS. 2 and 3 are views illustrating an embodiment referred to describing an operation of a polarization synthesizing unit according to one embodiment of the present disclosure.

First, referring to FIG. 2, when receiving two signals, that is, a first input signal and a second input signal, the polarization synthesizing unit 320 may extract first and second polarization components orthogonal to each other from the first and second input signals.

In addition, the polarization synthesizing unit 320 may convert the first and second polarization components and extract third and fourth polarization components orthogonal to each other.

At this time, the polarization synthesizing unit 320 may extract four polarization components based on the input signals using a matrix of [Equation 1] below.

$$\begin{bmatrix} 1 & 0 \\ 0 & 1 \\ \frac{1}{\sqrt{2}} & \frac{1}{\sqrt{2}} \\ \frac{1}{\sqrt{2}} & \frac{e^{j\pi}}{\sqrt{2}} \end{bmatrix} \begin{bmatrix} a \\ b \end{bmatrix} = \begin{bmatrix} a \\ b \\ \frac{a+b}{\sqrt{2}} \\ \frac{a+be^{j\pi}}{\sqrt{2}} \end{bmatrix} \quad \text{[Equation 1]}$$

In [Equation 1], a and b denote the first and second polarization components, respectively, and $$\frac{(a+b)}{\sqrt{2}} \text{ and } \frac{(a+be^{j\pi})}{\sqrt{2}}$$

denote the third and fourth polarization components, respectively.

Here, the first and second polarization components may form one first orthogonal polarization pair. For example, the first and second polarization components may be any one of ±45 degree polarization components or vertical/horizontal polarization components.

Here, the third and fourth polarization components may form the other second orthogonal polarization pair. For example, the third and fourth polarization components may be the other of the ±45 degree polarization components or the vertical/horizontal polarization components.

As described above, the polarization synthesizing unit 320 may extract the four polarization components based on the input signals using the matrix of [Equation 1], and thus form multiple beams in which the heterogeneous polarization pairs intersect each other.

That is, the radio transmission and reception apparatus according to one embodiment of the present disclosure may form the multiple beams in a method of dividing a fixed beam in one cell (or one sector) into a plurality of beams having different phases using the matrix and providing the polarization component of the orthogonal polarization pair to each divided beam.

Here, the polarization components of the input signals may be determined according to the characteristics of the array antenna 100.

For example, when each antenna module 110 of the array antenna 100 is a ±45 degree polarization antenna module, the first and second polarization components may be the ±45 degree polarization components, and the third and fourth polarization components may be the vertical/horizontal polarization components.

For an embodiment thereof, reference will be made to FIG. 3.

Figure 3:
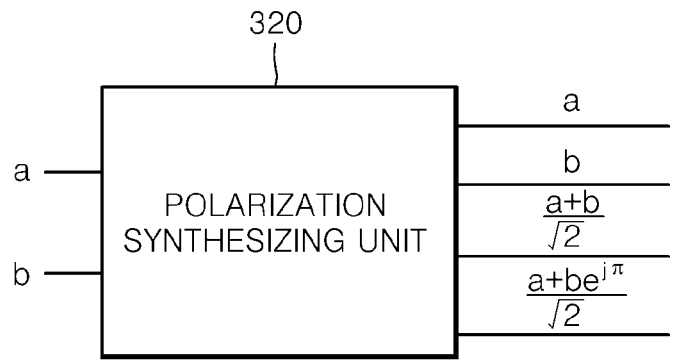

Referring to FIG. 3, the polarization components a and b of the first input signal and the second input signal are determined according to the characteristics of the array antenna 100. Therefore, the polarization synthesizing unit 320 extracts the first and second polarization components a and b when the polarization components a and b are determined.

In addition, the polarization synthesizing unit 320 extracts the third polarization component by synthesizing the polarization components a and b with $$\frac{(a+b)}{\sqrt{2}}$$

and extracts the fourth polarization component by synthesizing the polarization components a and b with $$\frac{(a+be^{j\pi})}{\sqrt{2}}$$

using the matrix of [Equation 1].

In the following embodiment, a description will be made assuming that the first polarization component is formed of +45 degree polarization, the second polarization component is formed of −45 degree polarization, the third polarization component is formed of vertical polarization, and the fourth polarization component is formed of horizontal polarization, but the present disclosure is not limited thereto.

Therefore, the polarization synthesizing unit 320 synthesizes the polarization components of the orthogonal polarization pairs using the extracted first to fourth polarization components and outputs signals in which the orthogonal polarization pairs have been synthesized to the polarization allocation unit 330.

The polarization allocation unit 330 selects any one of the orthogonal polarization pairs, which have been synthesized by the polarization synthesizing unit 320, that is, the ±45 degree orthogonal polarization pair and the vertical/horizontal (V/H) orthogonal polarization pair for beam formation and allocates the selected orthogonal polarization pair to each of multiple beams. At this time, physical polarization synthesis of the orthogonal polarization pairs allocated to the multiple beams is performed at the array antenna 100 stage.

The polarization allocation unit 330 may allocate an orthogonal polarization pair applied to each beam based on the number of beams formed by the array antenna 100, the polarization of a reference beam, etc.

Here, the polarization allocation unit 330 may directly receive information on the number of beams, the polarization of the reference beam, etc.

Meanwhile, when receiving the polarization allocation control signal from the polarization allocation control unit 380, the polarization allocation unit 330 may also allocate the orthogonal polarization pair applied to each beam according to the received polarization allocation control signal.

At this time, the polarization allocation unit 330 allocates any one of the orthogonal polarization pairs to the reference beam among the multiple beams and cross-allocates different types of the orthogonal polarization pairs to adjacent beams based on the orthogonal polarization pair of the reference beam.

That is, the polarization allocation unit 330 may allocate the first orthogonal polarization pair of the first and second polarization components to the first beam that is a reference and allocate the second orthogonal polarization pair of the third and fourth polarization components to the second beam adjacent to the first beam. In addition, the polarization allocation unit 330 may cross-allocate the first orthogonal polarization pair to a third beam adjacent to the second beam again.

For a detailed description of the operation of allocating the orthogonal polarization pair to each beam in the polarization allocation unit 330, reference will be made to FIGS. 4A and 4B.

Figure 4A:
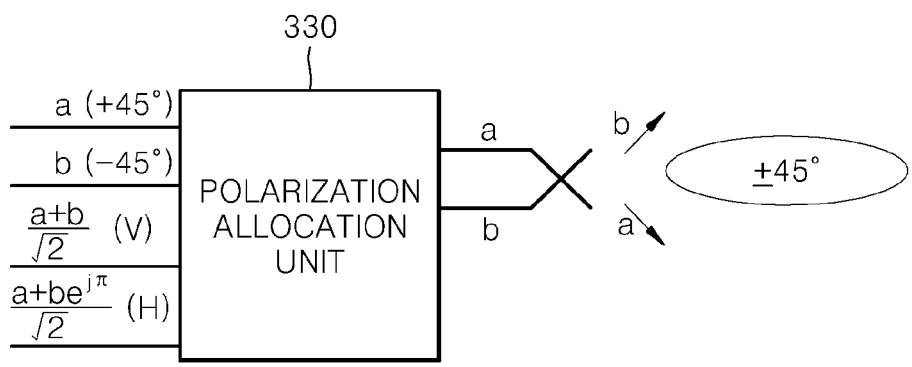
FIGS. 4A, 4B, and 5 are views illustrating an embodiment referred to describing an operation of a polarization allocation unit according to one embodiment of the present disclosure.
Figure 4B:
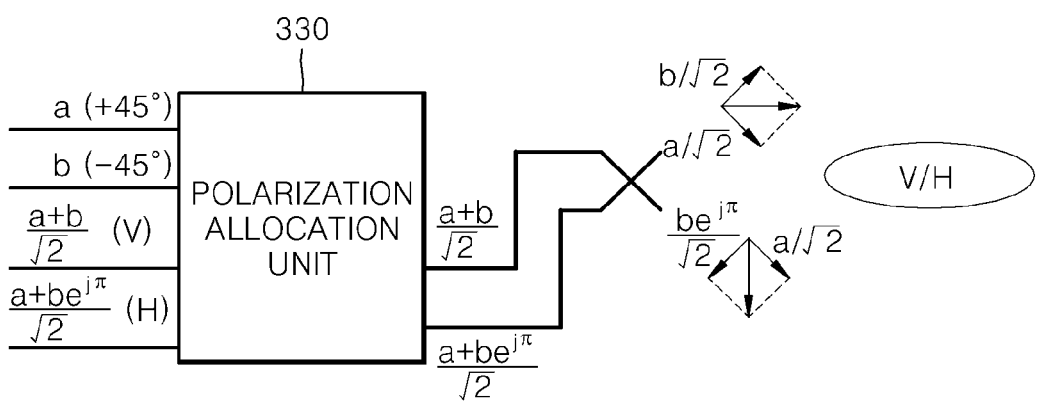

As illustrated in FIGS. 4A and 4B, the polarization allocation unit 330 may allocate the ±45 degree orthogonal polarization pair or the V/H orthogonal polarization pair formed of the four polarization components of +45, −45, V, and H extracted based on input signals $S_1$ and $S_2$ to each of the multiple beams. Here, it is assumed that $S_1$ is a +45 degree polarization signal and $S_2$ is a −45 degree polarization signal.

At this time, the polarization allocation unit 330 may allocate the ±45 degree orthogonal polarization pair to the first beam of any one of the multiple beams as illustrated in FIG. 4A. In this case, the array antenna 100 may form the first beam using the +45 degree polarization signal and the −45 degree polarization signal.

Meanwhile, the polarization allocation unit 330 may allocate the V/H orthogonal polarization pair to at least one second beam adjacent to the first beam as illustrated in FIG. 4B. In this case, the array antenna 100 may form the second beam using the vertical (V) polarization signal and the horizontal (H) polarization signal. Of course, the polarization allocation unit 330 may re-allocate the ±45 degree orthogonal polarization pair to at least one beam adjacent to the second beam.

As described above, the polarization allocation unit 330 may cross-allocate the ±45 degree orthogonal polarization pair or the V/H orthogonal polarization pair to the multiple beams. In this case, when the multiple beams are formed in the array antenna 100, since adjacent beams have heterogeneous polarization components, that is, different types of polarization components, a correlation between the adjacent beams can be reduced, thereby increasing signal transmission and reception efficiency.

Figure 5:
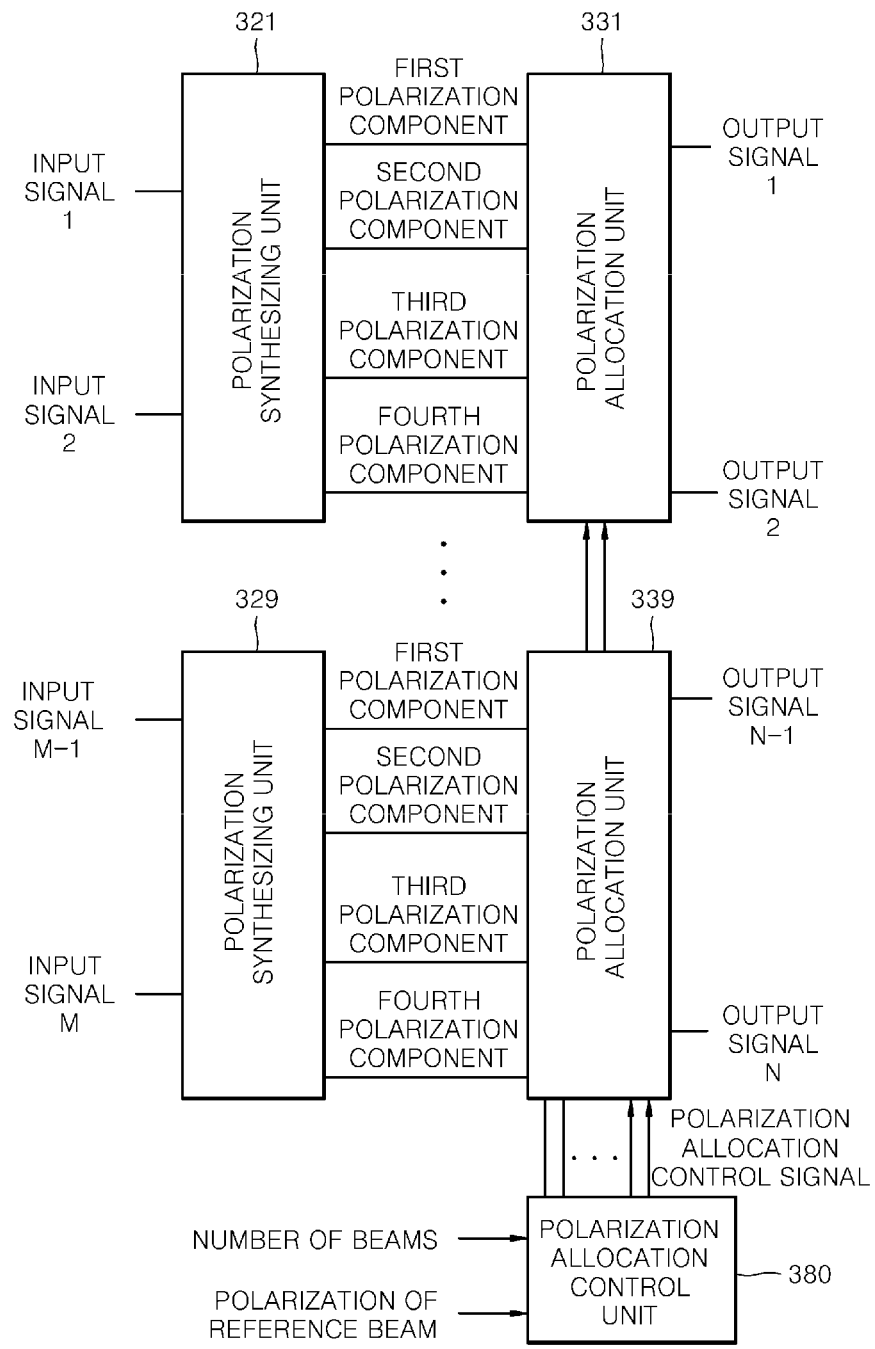

Although FIG. 1 illustrates that one polarization synthesizing unit 320 and one polarization allocation unit 330 are configured, as illustrated in FIG. 5, a plurality of polarization synthesizing units 320 and a plurality of polarization allocation units 330 may also be configured.

In this case, the polarization allocation control unit 380 may control operations of the plurality of polarization allocation units 330.

When receiving the information on the number of beams to be formed and the polarization of the reference beam, the polarization allocation control unit 380 may generate a polarization allocation control signal corresponding to each beam in response to the number of input beams. Here, the polarization allocation control signal may include information on a target beam to which an orthogonal polarization pair is allocated and information on the orthogonal polarization pair allocated to the target beam.

The polarization allocation control unit 380 may transmit the polarization allocation control signal generated corresponding to each beam to each of the plurality of polarization allocation units 330.

Here, the polarization allocation control unit 380 may determine the polarization allocation unit 330 corresponding to each beam to be formed and transmit the polarization allocation control signal to each polarization allocation unit 330. In this case, each polarization allocation unit 330 may allocate the orthogonal polarization pair to the target beam based on the polarization allocation control signal received from the polarization allocation control unit 380.

When allocating the orthogonal polarization pair to each beam, the polarization allocation unit 330 may output the information on the orthogonal polarization pair allocated to each beam to the multi-beam forming unit 340.

Here, the multi-beam forming unit 340 divides the fixed beam in the cell (or the sector) into a plurality of beams having different phases using the matrix and provides the polarization components of the orthogonal polarization pair to each divided beam.

Therefore, when receiving the information on the orthogonal polarization pair allocated to each beam from the polarization allocation unit 330, the multi-beam forming unit 340 generates each beam signal for the multiple beams using the information on the orthogonal polarization pair allocated to each beam.

At this time, the multi-beam forming unit 340 may differently set the phase of each beam signal. Here, since each beam signal has a different phase, beams having different directivities may be formed when the beams are formed by the array antenna 100.

The multi-beam forming unit 340 outputs each generated beam signal to each antenna module 110 of the array antenna 100 after passing the RF chain 210 of the RF unit 200. Here, each beam signal may include the signal of the orthogonal polarization pair allocated to the target beam.

For a detailed description of the operation of generating the beam signal of the multi-beam forming unit 340, reference will be made to the embodiment of FIG. 6.

Figure 6:
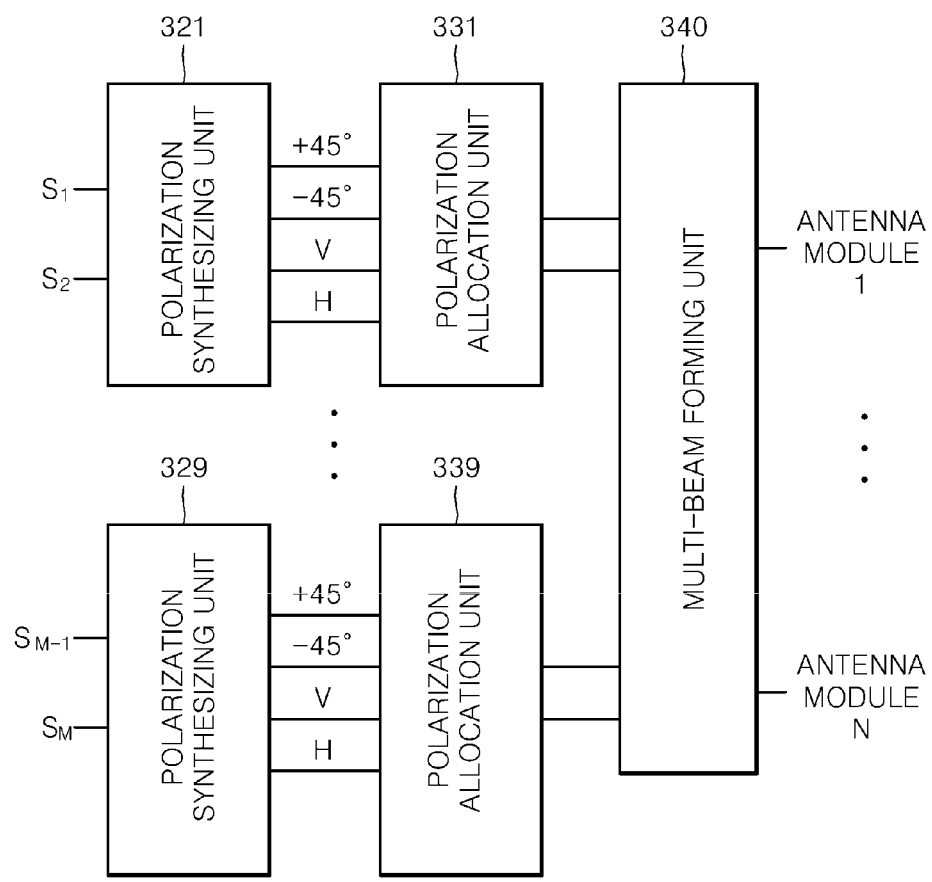
FIG. 6 is a view illustrating an embodiment referred to describing an operation of a multi-beam forming unit according to one embodiment of the present disclosure.

Referring to FIG. 6, when the orthogonal polarization pair is allocated to each beam in response to input signals $S_1$, $S_2$, ..., and $S_M$ through the plurality of polarization synthesizing unit 320 and the polarization allocation unit 330, the multi-beam forming unit 340 may generate the beam signal corresponding to the polarization signal of the orthogonal polarization pair allocated to each beam.

Here, the multi-beam forming unit 340 may generate each beam signal by multiplying the input signals $S_1, S_2, \ldots,$ and $S_M$ by a weight vector. In this case, a direction and shape of each beam signal may vary depending on a value of the weight vector multiplied by the input signals.

Each beam signal generated by the multi-beam forming unit 340 may be output through each antenna module 110 of the array antenna 100 after passing the RF unit 200.

At this time, each of the RF chains 211 to 219 of the RF unit 200 performs frequency conversion of the input beam signal, that is, the polarization signal allocated to the beam and then transmits the frequency-converted signal through the corresponding antenna module 110.

Here, before outputting the beam signal to each of the RF chains 211 to 219, the DU 300 corrects the magnitude and phase of the beam signal by the magnitude/phase correction unit 350 and the polarization synthesis calibration unit 390.

The polarization synthesis of the polarization components synthesized by the polarization synthesizing unit 320 are substantially performed at the array antenna 100 side. At this time, when the magnitude and phase of the beam signal at the time of performing the polarization synthesis are not equal to the magnitude and phase of the RF chain 210, directions of the polarization are displaced, and thus it is necessary to equally correct the magnitude and phase of the beam signal.

Therefore, the polarization synthesis calibration unit 390 may generate a correction signal after comparing the magnitude and phase of the beam signal at the time of performing the polarization synthesis of the orthogonal polarization pair allocated to the beam with the magnitude and phase of the signal of the RF chain 210 and transmit the generated correction signal to the magnitude/phase correction unit 350.

Therefore, the magnitude/phase correction unit 350 corrects the magnitude and phase of the polarization of the beam signal based on the correction signal transmitted from the polarization synthesis calibration unit 390. At this time, the magnitude/phase correction unit 350 corrects the magnitude and phase of the polarization of the polarization-synthesized beam signal identically with the magnitude and phase of the signal of the RF chain 210.

However, the polarization synthesis calibration unit 390 generates the correction signal only for the signal undergoing the polarization synthesis and transmits the correction signal to the magnitude/phase correction unit 350, and at this time, the magnitude/phase correction unit 350 corrects the magnitude and phase of the polarization of only the beam signal to be corrected.

For example, assuming that the polarization component of the antenna is −45 degree polarization, the magnitude/phase correction unit 350 may correct the magnitude and phase of the polarization signal only when V/H polarization synthesis is performed.

Here, the magnitude/phase correction unit 350 may be implemented to correspond to the number of RF chains 210 to correct the magnitude and phase of the polarization of the beam signal and output the corrected beam signal to the corresponding RF chain 210.

For an embodiment thereof, reference will be made to FIG. 7.

Figure 7:
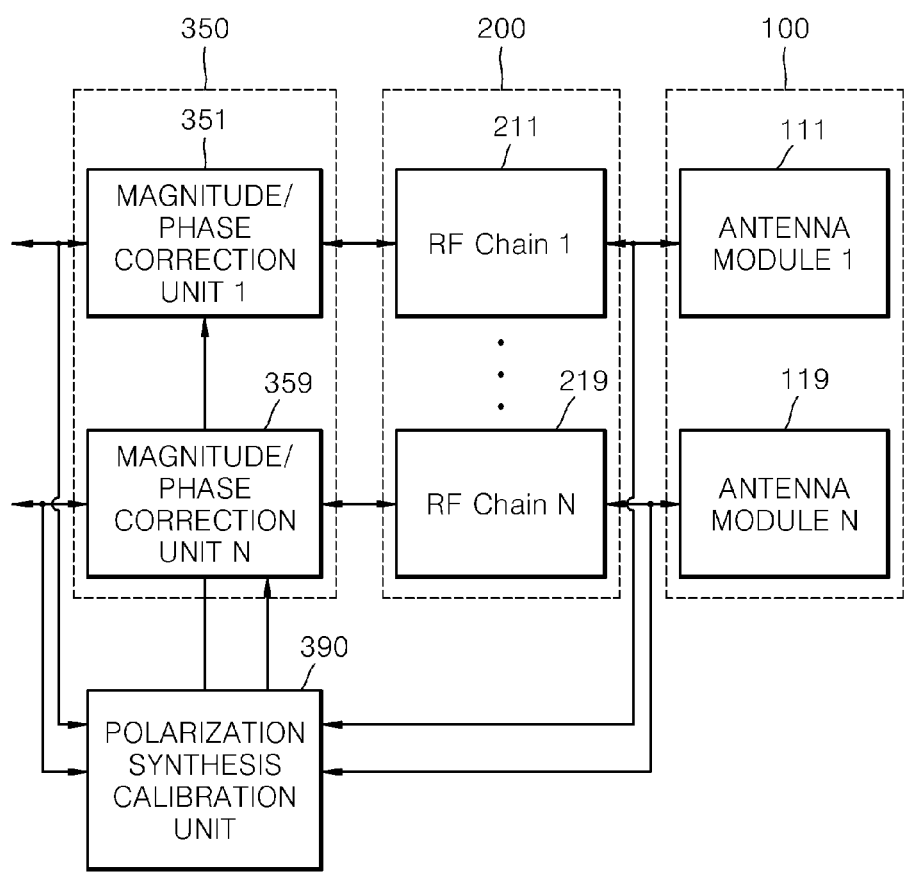
FIG. 7 is a view illustrating an embodiment referred to describing an operation of a magnitude/phase correction unit according to one embodiment of the present disclosure.

As illustrated in FIG. 7, the plurality of RF chains 211 to 219 may respectively correspond to the plurality of antenna modules 111 to 119, and the magnitude/phase correction units 351 to 359 may be implemented to correspond to the plurality of RF chains 211 to 219 and connected to respectively correspond to the plurality of RF chains 211 to 219.

For example, the first magnitude/phase correction unit 351 may correct the magnitude and phase of the polarization-synthesized beam signal identically with the magnitude and phase of the first RF chain 211 and output the corrected beam signal to the first antenna module 111 after passing the first RF chain 211.

Therefore, the first antenna module forms a beam corresponding to the corrected magnitude and phase.

As described above, the magnitude/phase correction unit 350 may correct a change in the magnitude and phase of the signal generated at the time of polarization synthesis, thereby securing channel reversibility and form a beam in an accurate direction in the array antenna. Therefore, each antenna module 110 forms multiple beams according to each input beam signal.

At this time, each beam formed by each antenna module 110 has both a different direction and heterogeneous polarization characteristics between adjacent beams.

For an embodiment of the operation of forming the beam in the array antenna 100 based on the beam signal, reference will be made to FIG. 8.

Figure 8:
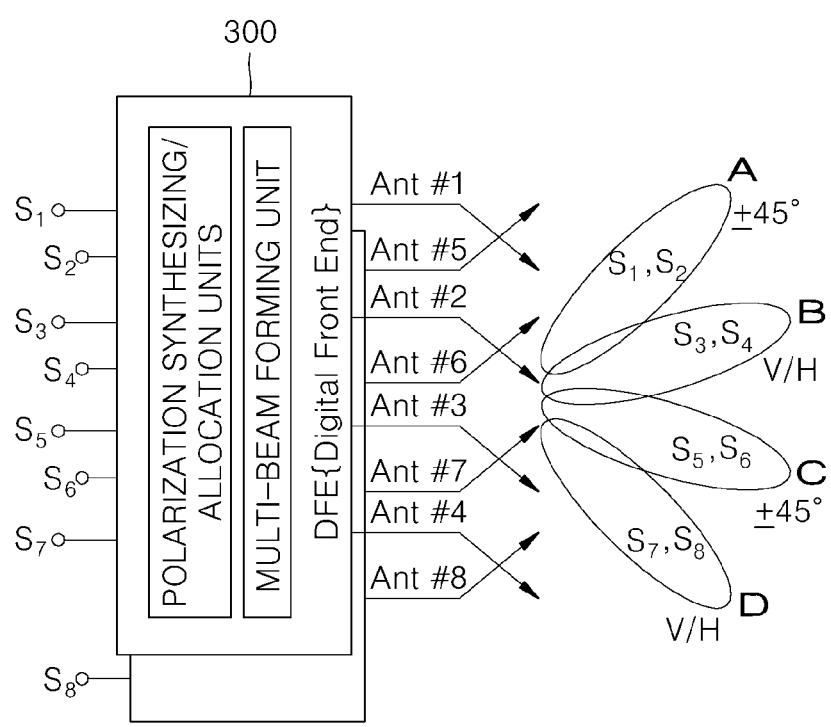
FIGS. 8, 9A, and 9B are views illustrating an embodiment referred to describing a beam forming operation according to one embodiment of the present disclosure.

As illustrated in FIG. 8, the first antenna module receiving the beam signals of the input signals $S_1$ and $S_2$ outputs the ±45 degree orthogonal polarization signals. At this time, a beam A is formed in a first direction in the array antenna 100 by the output ±45 degree orthogonal polarization signals.

In addition, the second antenna module receiving the beam signals of the input signals $S_3$ and $S_4$ outputs different types of the V/H orthogonal polarization signals from the adjacent beam A. At this time, a beam B is formed in a second direction in the array antenna 100 by the output V/H orthogonal polarization signals.

In addition, the third antenna module receiving the beam signals of the input signals $S_5$ and $S_6$ outputs different types of the ±45 orthogonal polarization signals from the adjacent beam B. At this time, a beam C is formed in a third direction in the array antenna 100 by the output ±45 degree orthogonal polarization signals.

In addition, the fourth antenna module receiving the beam signals of the input signals $S_7$ and $S_8$ outputs different types of the V/H orthogonal polarization signals from the adjacent beam C. At this time, a beam D is formed in a fourth direction in the array antenna 100 by the output V/H orthogonal polarization signals.

As illustrated in FIG. 8, the multiple beams formed by the array antenna 100 are formed so that each beam faces in a different direction, and adjacent beams are formed of the heterogeneous orthogonal polarization pairs.

Figure 9A:
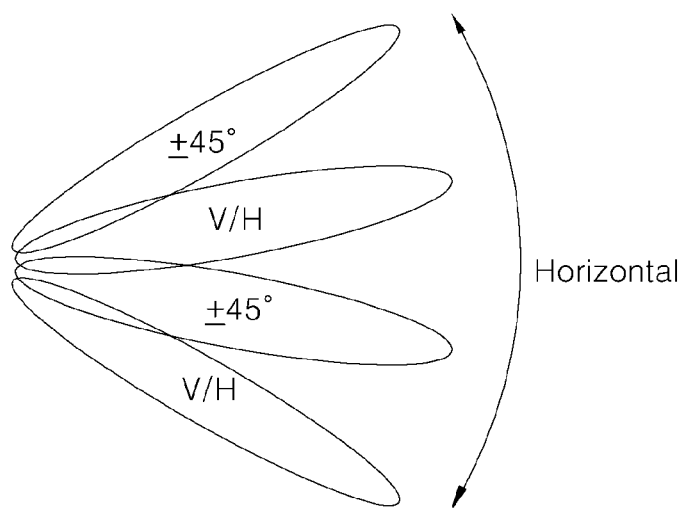
Figure 9B:
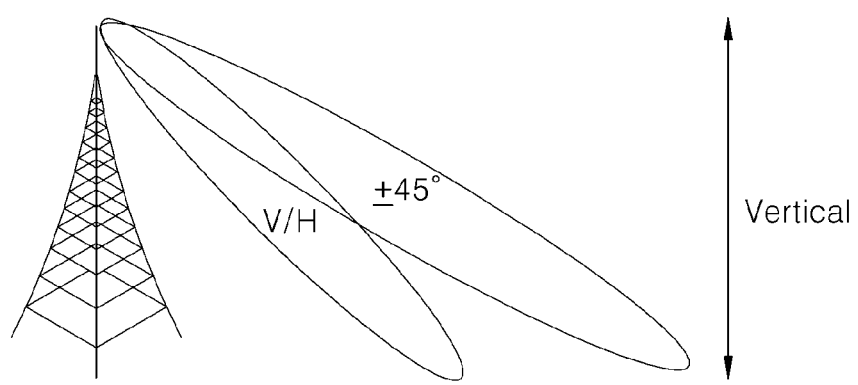

Here, among the multiple beams formed by the array antenna 100, adjacent beams in the horizontal direction have different directions and orthogonal polarization pairs as illustrated in FIG. 9A, and adjacent beams in the vertical direction also have different directions and orthogonal polarization pairs as illustrated in FIG. 9B.

As described above, the multiple beams formed through the array antenna 100 are spatially separated according to a set phase and radiated in the form of a plurality of beams. At this time, since each beam is radiated in a state of having the polarization direction of the radiation element radiated by each beam, two beams spatially adjacent to each other may have different polarizations.

Although an overlapping region is present between the beams radiated by the radio transmission and reception apparatus according to the present disclosure, since the polarizations between adjacent beams are different, it is possible to solve the problem of the correlation between the signals.

As described above, the beam forming process has been described focusing on the configuration and operation in the case of transmitting the signal.

Figure 10:
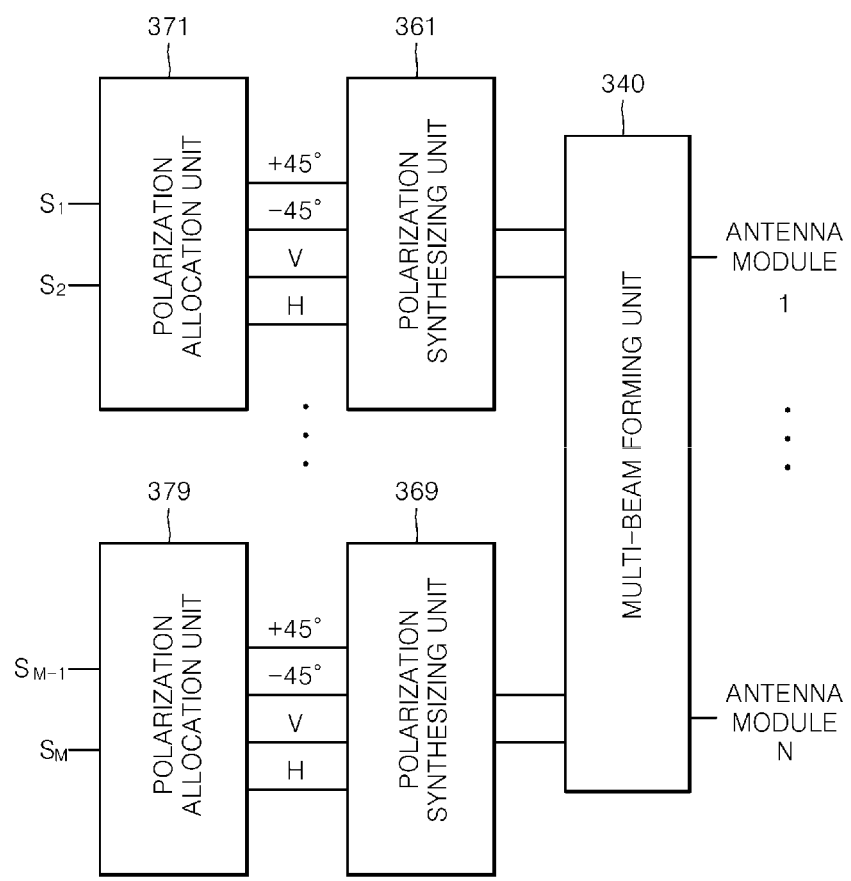
FIGS. 10, 11A, and 11B are views illustrating an embodiment referred to describing a reception operation of a digital unit according to one embodiment of the present disclosure.

Meanwhile, even in the case of receiving the signal, an operation is only performed in the reverse order of the case of transmitting the signal, and a detailed operation thereof is not significantly different. However, describing a detailed operation of the DU 300, as illustrated in FIG. 10, in the process of receiving the signal, unlike the case of transmitting the signal, the placement positions of the polarization synthesizing units 361 to 369 and the polarization allocation units 371 to 379 may be changed.

For an embodiment of detailed operations of the polarization synthesizing units 361 to 369 and the polarization allocation units 371 to 379 in the case of receiving the signal, reference will be made to FIGS. 11A and 11B.

Figure 11A:
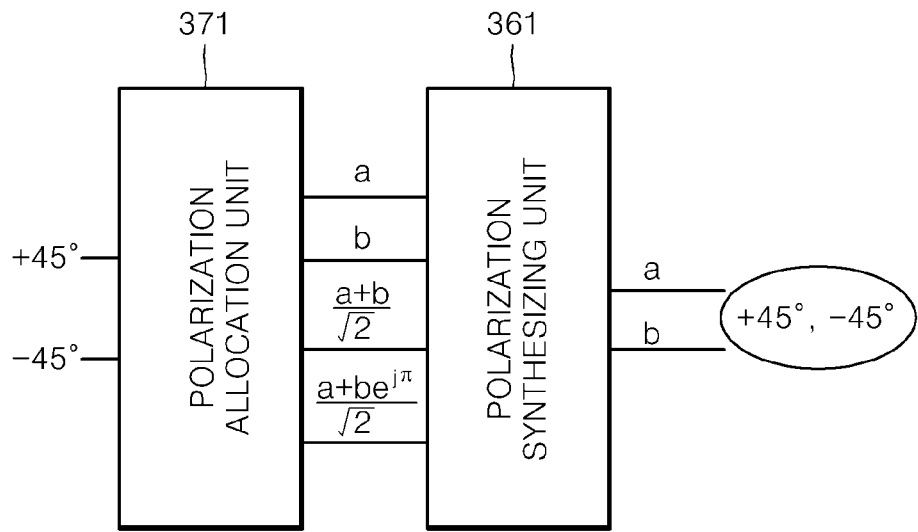
Figure 11B:
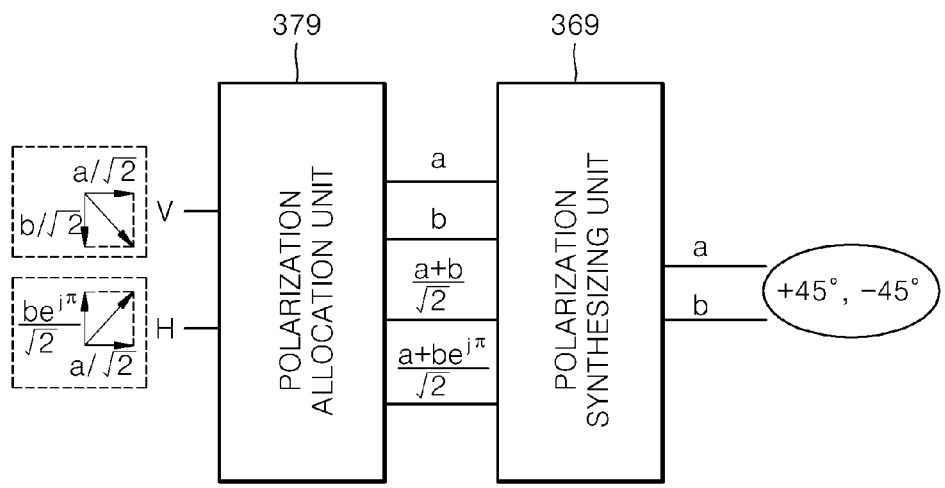

Referring to FIGS. 11A and 11B, when it is assumed that the polarization components of the reception beam are ±45 degrees, the polarization synthesizing units 361 to 369 have four polarization components, that is, +45 degrees, −45 degrees, V, and H based on ±45 degrees that are the polarization components of the reception beam.

Here, the polarization synthesizing units 361 to 369 extract the first polarization component a and the second polarization component b based on the polarization components of the reception beam. In addition, the polarization synthesizing units 361 to 369 extract the third polarization component by synthesizing the polarization components a and b with $$\frac{(a+b)}{\sqrt{2}}$$

and extract the fourth polarization component by synthesizing the polarization components a and b with $$\frac{(a+be^{j\pi})}{\sqrt{2}}$$

using the matrix of [Equation 1].

Here, the following description will be made assuming that the first polarization component a is the +45 degree polarization, the second polarization component b is the −45 degree polarization, the third polarization component $$\frac{(a+b)}{\sqrt{2}}$$

is the vertical polarization, and the fourth polarization component $$\frac{(a+be^{j\pi})}{\sqrt{2}}$$

is the horizontal polarization, but the present disclosure is not limited thereto.

The polarization allocation units 371 to 379 allocate the ±45 degree orthogonal polarization pair or the V/H orthogonal polarization pair formed of the four polarization components extracted based on the polarization components of the reception beam to each of the output signals.

For example, as illustrated in FIG. 11A, the polarization allocation unit 371 may allocate the ±45 degree orthogonal polarization pair to the first signal converted into the digital signal in response to the reception beam.

Meanwhile, as illustrated in FIG. 11B, the polarization allocation unit 379 may allocate the V/H orthogonal polarization pair to the second signal.

In the embodiment of FIG. 1, it has been described that the multi-beam forming unit 340 is disposed between the polarization synthesizing unit 320 or the polarization allocation unit 330 and the magnitude/phase correction unit 350, but the placement position of the multi-beam forming unit 340 may be changed according to embodiments.

Embodiment 2

Figure 12:
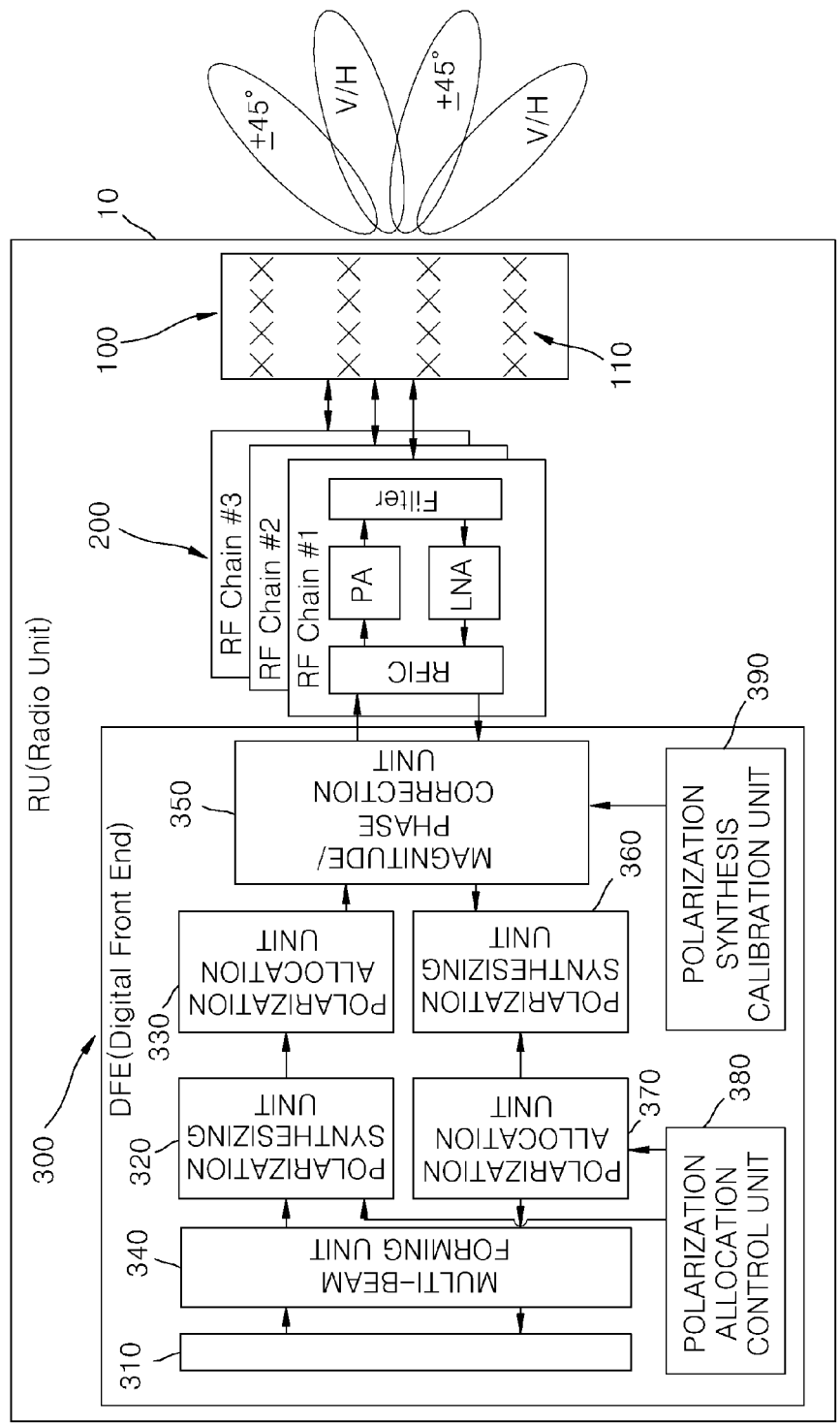
FIG. 12 is a view illustrating a configuration of a radio transmission and reception apparatus according to a second embodiment of the present disclosure.
Figure 13:
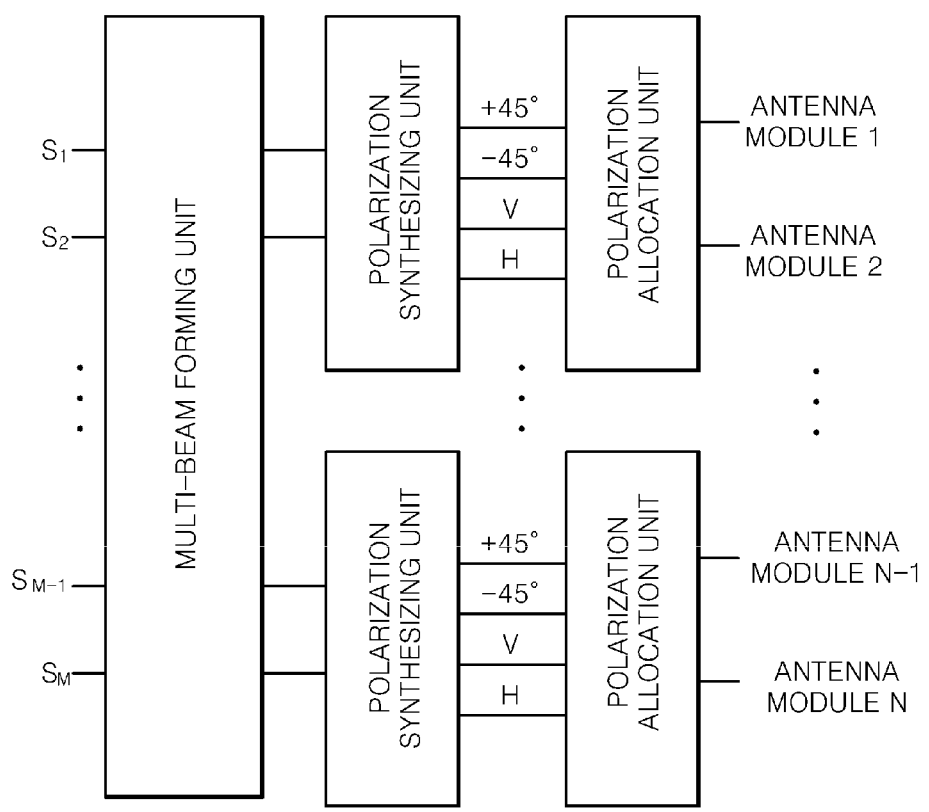
FIGS. 13 and 14 are views illustrating an embodiment referred to describing an operation of a digital unit according to the second embodiment of the present disclosure.

FIG. 12 illustrates an embodiment in which the position of the multi-beam forming unit has been changed.

As illustrated in FIG. 12, the multi-beam forming unit may also be disposed between the interface and the polarization synthesizing unit or the polarization allocation unit.

In the case of transmitting the signal in the embodiment of FIG. 12, as illustrated in FIG. 12, the multi-beam forming unit may generate multi-beam signals having different phases with respect to the input signals $S_1, S_2, \ldots,$ and $S_m$ and output the generated multi-beam signals to the polarization synthesizing unit. In this case, the polarization synthesizing unit may synthesize the polarization components of the orthogonal polarization pair of each beam signal generated by the multi-beam forming unit and select any one of the heterogeneous orthogonal polarization pairs and allocate the selected orthogonal polarization pair to each beam signal in the polarization allocation unit.

Figure 14:
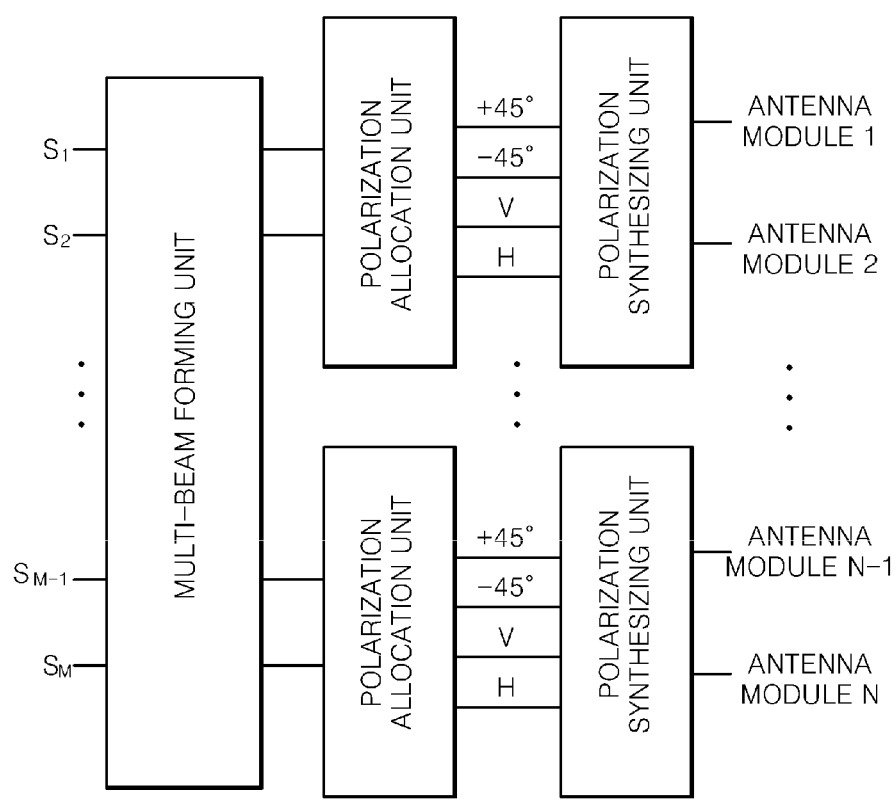

In the embodiment of FIG. 12, even in the case of receiving the signal, the operation is performed in the reverse order of the case of transmitting the signal, but as illustrated in FIG. 14, the positions of the polarization synthesizing unit and the polarization allocation unit may be changed. Here, the operations of the polarization synthesizing unit and the polarization allocation unit in the case of receiving the signal may be described with the operations of FIGS. 11A and 11B. Therefore, an overlapping description thereof will be omitted.

Even when the position of the multi-beam forming unit is changed as illustrated in FIG. 12, a function and an operation of each of other components are the same as the configuration of the embodiment illustrated in FIG. 1 excluding some operations of the polarization synthesizing unit and the polarization allocation unit.

Embodiment 3

Figure 15:
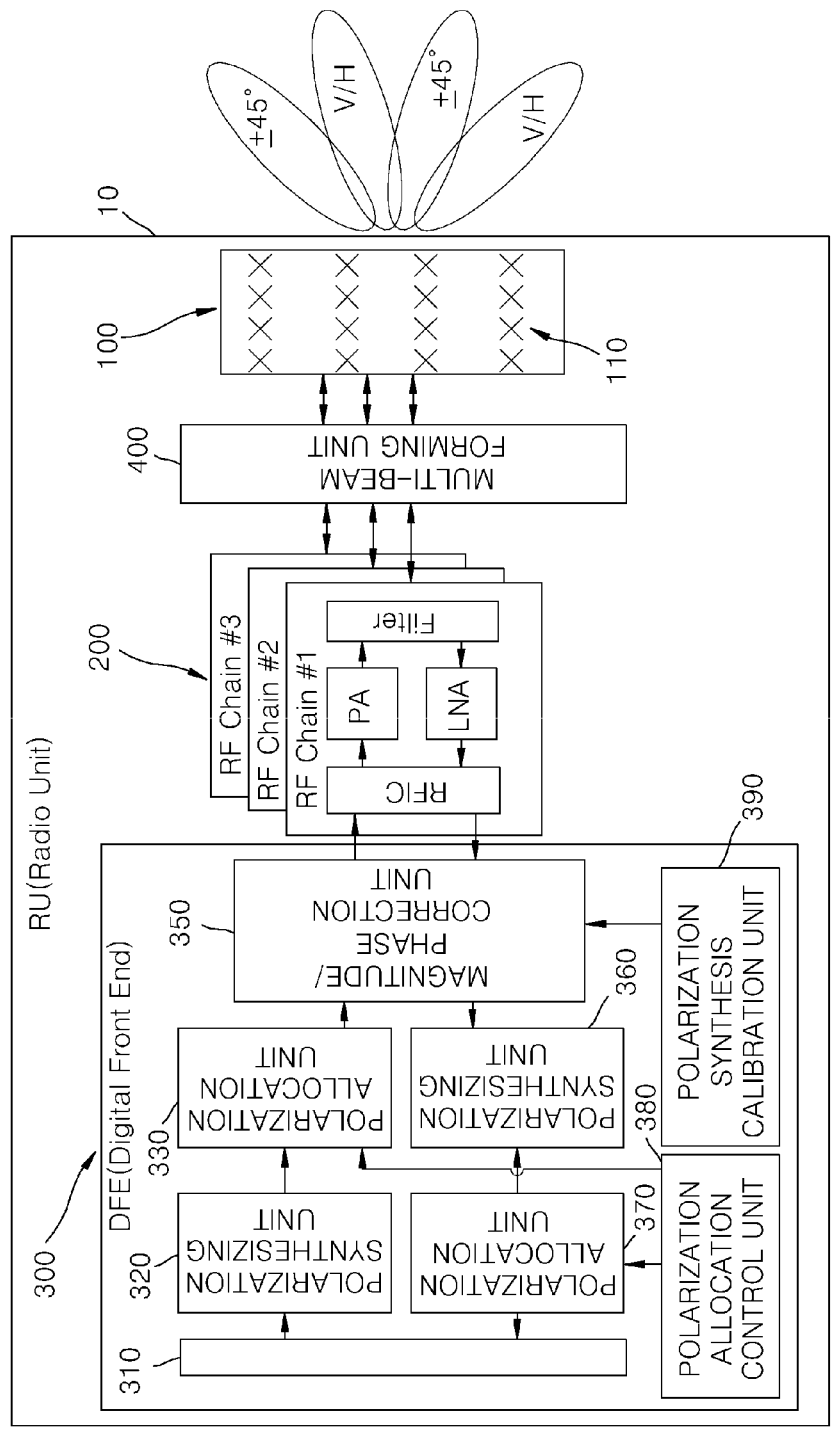
FIG. 15 is a view illustrating a configuration of a radio transmission and reception apparatus according to a third embodiment of the present disclosure.

In the embodiments of FIGS. 1 and 12, the embodiments in which the multi-beam forming unit is disposed within the DU 300 are illustrated, but the multi-beam forming unit may also be disposed at an analog stage as illustrated in FIG. 15.

As illustrated in FIG. 15, a multi-beam forming unit 400 may be disposed between the RF chain of the RF unit 200 and the array antenna 100.

Unlike the embodiments of FIGS. 1 and 12 described above, the multi-beam forming unit 400 in the embodiment may generate beam signals having directivity in different directions through the analog beam forming. Specifically, the multi-beam forming unit 400 may generate the beam signals in different directions by adjusting the phase of the analog signal, which has undergone the digital signal processing, in response to each array antenna 100. As described above, as the phase of each beam signal is adjusted, a phase between the array antennas 100 with respect to the reference antenna is adjusted.

In this case, the multi-beam forming unit 400 may be implemented in the form of a phase setting module for phase-shifting the phase of the signal output by the RF chain and outputting the signal to the array antenna 100. The phase setting module may differently set the phases of the transmission signals or the reception signals so that the beams radiated through the antenna module are spatially separated.

For example, the phase setting module may be implemented using a phase shifter or the like.

Here, the analog beam forming has an advantage in that implementation is easy because the direction of the beam uses a predetermined weight vector and thus there is no need for a separate algorithm for calculating the weight vector.

In addition, a general digital beam forming is performed at the baseband stage, while the analog beam forming according to the present disclosure is performed through phase shift in the analog region rather than the baseband stage, thereby making it easier to implement than the digital beam forming.

In the embodiment of FIG. 15, since only the placement position and implementation module of the multi-beam forming unit are different and functions and operations of other components may be identically performed, overlapping descriptions thereof will be omitted.

As described above, the radio transmission and reception apparatus 10 according to the present disclosure may use the heterogeneous polarizations rather than using the homogeneous polarizations between adjacent beams among the multiple beams formed within the cell or the sector, thereby reducing the correlation between the adjacent beams and maximizing antenna efficiency.

In addition, in the embodiment of the present disclosure, it has been described that the heterogeneous polarization pairs such as the ±45 degree orthogonal polarizations and the V/H orthogonal polarizations are allocated to the beams, but any kind of polarizations orthogonal to each other such as left hand circular polarization and right hand circular polarization may be used as the heterogeneous polarizations.

Figure 16A:
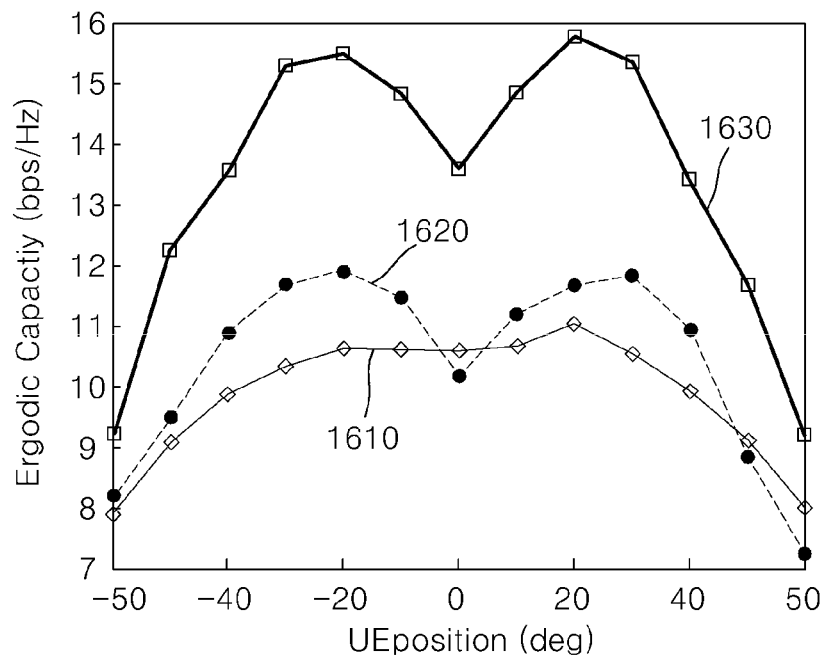
FIGS. 16A and 16B are views illustrating an embodiment referred to describing an operation effect of the radio transmission and reception apparatus according to one embodiment of the present disclosure.
Figure 16B:
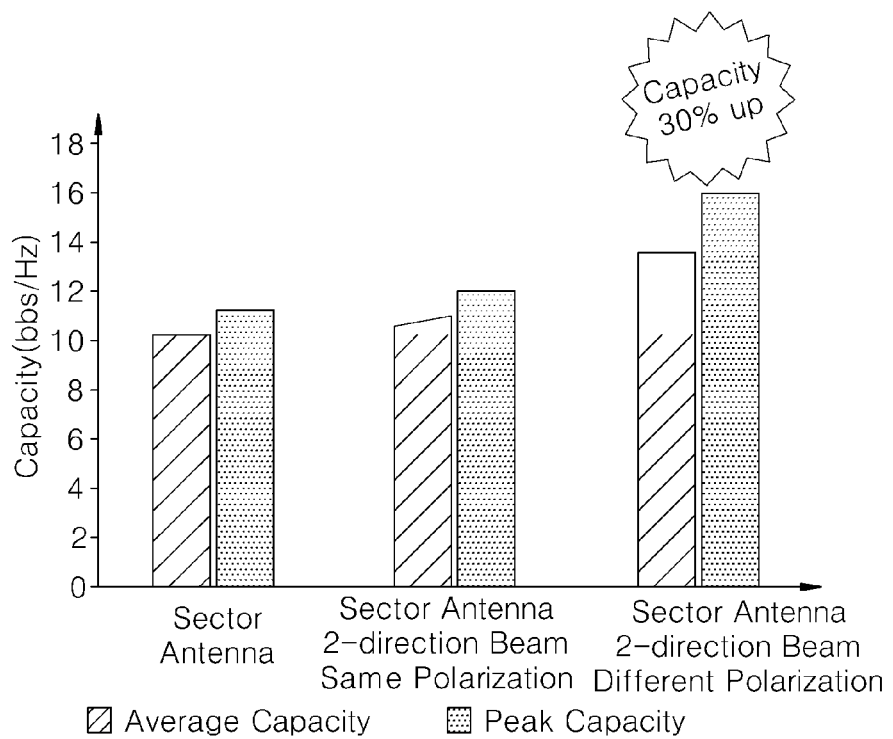

FIGS. 16A and 16B are views illustrating an embodiment referred to describing an operation effect of the radio transmission and reception apparatus according to the embodiment of the present disclosure.

The radio transmission and reception apparatus according to one embodiment of the present disclosure provides the orthogonal polarization pair to each of the multiple beams formed in the cell or the sector and provides the heterogeneous orthogonal polarization pairs rather than the homogeneous polarization pairs between adjacent beams. Therefore, the radio transmission and reception apparatus according to the present disclosure can reduce the correlation between the adjacent beams among the multiple beams formed by the array antenna.

In addition, since the heterogeneous orthogonal polarization pairs are provided between the adjacent beams, it is possible to minimize the interference between the beams even when the adjacent beams overlap with each other and increase antenna efficiency and the capacity of the cell due to the overlapping of the beams.

This can also be confirmed through the graphs of FIGS. 16A and 16B.

First, FIG. 16A is a graph illustrating a change in an ergodic capacity according to a position of user equipment (UE) in an MIMO system having an array antenna having a 4×4 structure. Here, the ergodic capacity is the capacity of the cell (or the sector) of the antenna system and means that the performance of the antenna increases as the capacity of the cell (or the sector) increases. Referring to FIG. 16A, reference numeral 1610 is a graph illustrating a change in an ergodic capacity of a system using a conventional sector antenna, and reference numeral 1620 is a graph illustrating a change in an ergodic capacity of a system in which a beam is divided into two directions using a sector antenna. In addition, reference numeral 1630 is a graph illustrating a change in an ergodic capacity of a system using the antenna of the radio transmission and reception apparatus according to the present disclosure.

For example, a simulation result for the change in the ergodic capacity in FIG. 16A is calculated using an RU including an array antenna having four transmission antennas and four reception antennas by setting a carrier frequency to 3.5 GHz, and a tilt angle of the RU is adjusted in a range of about 10 degrees, and a position of the UE is calculated based on data measured under a condition in which the UE is disposed at intervals of 10 degrees between −60 degrees and +60 degrees at a distance away from the RU at about 160 m.

As illustrated in FIG. 16A, the ergodic capacity 1610 in the system using the conventional sector antenna varies in a range of about 8 bps/Hz to 11 bps/Hz, and an ergodic capacity 1620 of the system in which one sector is divided into two beams (homogeneous polarizations) varies in a range of about 8 bps/Hz to 12 bps/Hz. In contrast, it can be confirmed that the ergodic capacity 1630 of the radio transmission and reception according to the present disclosure varies in a range of about 9 bps/Hz to 16 bps/Hz.

As described above, it can be confirmed that the ergodic capacity of the radio transmission and reception apparatus according to the present disclosure is increased compared to the conventional sector antenna or the system in which the beam is divided into two directions using the sector antenna.

FIG. 16B illustrates a comparison of average capacities and peak capacities of the ergodic capacities in the graph of FIG. 16A.

Referring to FIG. 16B, in the system using the sector antenna, the average capacity of the ergodic capacities is about 10 bps/Hz and the peak capacity thereof is about 11 bps/Hz. In addition, the average capacity of the ergodic capacities in the system in which one sector is divided into two beams (homogeneous polarizations) is about 11 bps/Hz and the peak capacity thereof is about 12 bps/Hz. In this case, since this system employs the technology of dividing the beam into two directions but is formed so that each beam has the same polarization, the capacity of the sector is generated smaller than that of the technology of forming pairs of beams having different polarizations as in the present disclosure.

In contrast, the average capacity of the ergodic capacity of the radio transmission and reception apparatus according to the present disclosure is about 13 bps/Hz, and the peak capacity thereof is about 16 bps/Hz, and it can be confirmed that the average capacity and peak capacity of the radio transmission and reception apparatus according to the present disclosure have been increased by about 30% compared to the average capacity and maximum capacity of the system to which the sector antenna is applied.

As described above with reference to FIGS. 16A and 16B, the radio transmission and reception apparatus according to the present disclosure can increase antenna performance and the capacity of the cell (or the sector) as much as the ergodic capacity increases compared to the related art.

In addition, since beam forming generally performs all related operations in the DU of the antenna system, a capacity of a fronthaul increases.

That is, conventionally, the digital beam forming is processed in the DU of the antenna system, and at this time, beam forming, polarization synthesis, allocation, etc. performed on the respective beams transmitted to all antennas have been individually controlled through the digital signal processing in the baseband. As described above, there is a problem in that as the respective signals transmitted to each individual antenna are simultaneously processed, a load of the DU and the capacity of the fronthaul increase.

In particular, the digital beam forming is performed by multiplying an input signal by a weight vector, and at this time, since a complicated algorithm for calculating the weight vector needs to be executed, the load of the DU is increased due to the digital beam forming.

As described above, the increase in the load of the DU or the increase in the capacity of the fronthaul needs to be improved from the viewpoint of a fifth generation (5G) communication system.

To this end, the radio transmission and reception apparatus 10 according to the present disclosure allows the RU to perform operations such as the beam forming, polarization synthesis, and allocation performed by the DU of the antenna system. According to the present disclosure, by distributing the processing operation of the DU to the RU, thereby reducing the load of the DU and reducing the capacity of the fronthaul.

An operation flow of the radio transmission and reception apparatus according to the present disclosure configured as described above will be described in more detail as follows.

Figure 17:
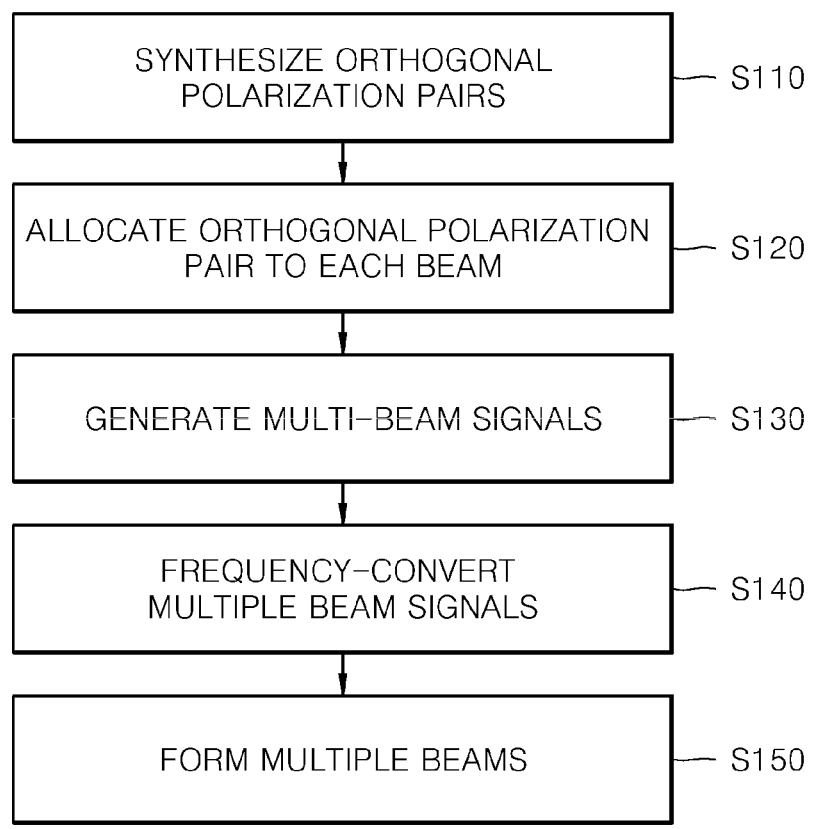
FIG. 17 is a view illustrating an operation flow of a beam forming method of the radio transmission and reception apparatus according to the first embodiment of the present disclosure.

FIG. 17 is a view illustrating an operation flow of a beam forming method of the radio transmission and reception apparatus according to the first embodiment of the present disclosure.

Referring to FIG. 17, the radio transmission and reception apparatus 10 according to the first embodiment has a structure in which the multi-beam forming unit is disposed between the polarization allocation unit 330 and the magnitude/phase correction unit 350 in the DU 300 as illustrated in FIG. 1.

Therefore, the polarization synthesizing unit 320 of the radio transmission and reception apparatus 10 according to the first embodiment synthesizes the orthogonal polarization pairs to streams of the input signals (S110). At this time, the radio transmission and reception apparatus 10 may synthesize two orthogonal polarization signals orthogonal to each other into one orthogonal polarization pair.

For example, the radio transmission and reception apparatus 10 extracts four polarization components, that is, the ±45 degree polarization components and the vertical/horizontal polarization components using a predefined matrix based on the input signals, synthesizes the ±45 degree polarization components orthogonal to each other among the extracted orthogonal components into one orthogonal polarization pair, and synthesizes the V/H polarization components into the other orthogonal polarization pair.

Then, the polarization allocation unit 330 of the radio transmission and reception apparatus 10 allocates the two orthogonal polarization pairs synthesized in operation "S$_{110}$" to multiple beams (S$_{120}$). At this time, the polarization allocation unit 330 allocates any one of the orthogonal polarization pairs to the reference beam according to the number of beams and the polarization component of the reference beam, and allocates the other orthogonal polarization pair to beams adjacent to the reference beam.

The polarization synthesizing unit 320 of the radio transmission and reception apparatus 10 generates the multi-beam signals based on the signal of the orthogonal polarization pair allocated to each beam in operation "S120" (S130). At this time, the multiple beams generated in operation "S130" may be generated so that each beam has a different phase.

When the multi-beam signals having different phases are generated by the polarization synthesizing unit 320, the RF unit 200 of the radio transmission and reception apparatus 10 frequency-converts each beam signal through the plurality of RF chains 210 (S140) and forms beams having different directivities through each antenna module 110 of the array antenna 100 (S150).

The radio transmission and reception apparatus 10 transmits and receives signals through the beams formed through the above operations. At this time, since each beam has both a different directivity and heterogeneous polarization components between adjacent beams, the correlation between the adjacent beams can be reduced, thereby increasing signal transmission and reception efficiency of the array antenna 100.

Although not illustrated in FIG. 17, when polarization synthesis is performed on the polarization components of the orthogonal polarization pairs allocated in operation "S120," an operation of correcting the magnitudes and phases of the multi-beam signals generated in operation "S130" according to the magnitudes and phases of the signals of the RF chain 210 may be additionally performed before operation "S140." In this case, it is possible to form the beam in an accurate direction by preventing the direction of the polarization from being distorted during polarization synthesis.

Figure 18:
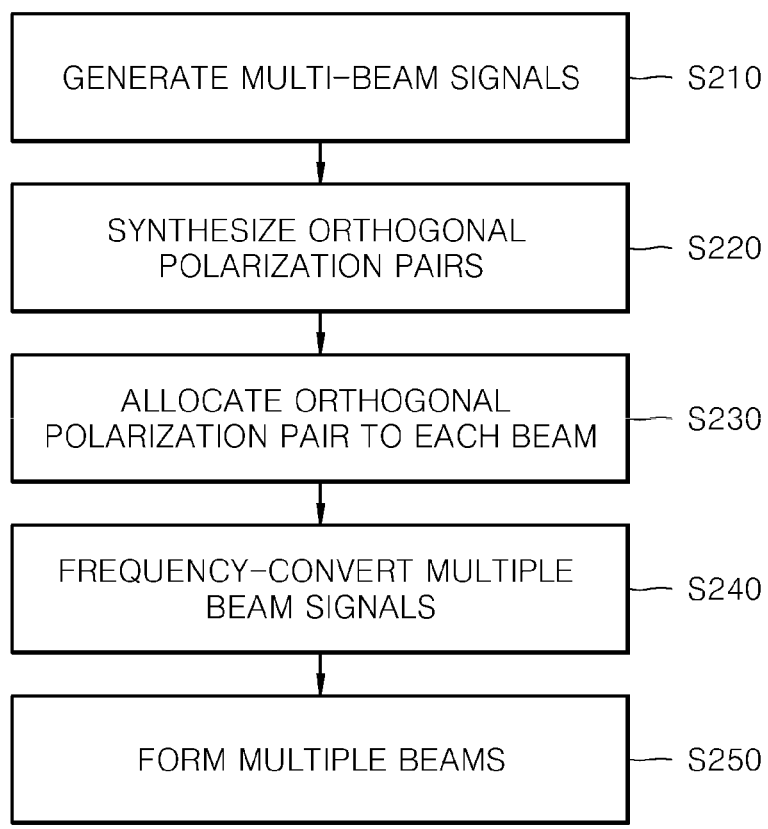
FIG. 18 is a view illustrating an operation flow of a beam forming method of the radio transmission and reception apparatus according to the second embodiment of the present disclosure.

FIG. 18 is a view illustrating a beam forming method of the radio transmission and reception apparatus according to the second embodiment of the present disclosure.

Referring to FIG. 18, the radio transmission and reception apparatus 10 according to the second embodiment has a structure in which the multi-beam forming unit is disposed between the interface and the polarization synthesizing unit 320 or the polarization allocation unit 330 in the DU 300 as illustrated in FIG. 12.

Therefore, the multi-beam forming unit of the radio transmission and reception apparatus 10 according to the second embodiment generates the multi-beam signals corresponding to the input signals (S210). At this time, the multi-beam forming unit may differently set the phase of each beam signal.

Then, the polarization synthesizing unit 320 of the radio transmission and reception apparatus 10 synthesizes the orthogonal polarization pairs to the multi-beam signals generated in operation "S210" (S220). At this time, the radio transmission and reception apparatus 10 may synthesize two orthogonal polarization signals orthogonal to each other into one orthogonal polarization pair.

For example, the radio transmission and reception apparatus 10 extracts four polarization components, that is, the ±45 degree polarization components and the vertical/horizontal polarization component using a predefined matrix based on the input signals, synthesizes the ±45 degree polarization components orthogonal to each other among the extracted orthogonal components into one orthogonal polarization pair, and synthesizes the V/H polarization components into the other orthogonal polarization pair.

Then, the polarization allocation unit 330 of the radio transmission and reception apparatus 10 allocates the two orthogonal polarization pairs synthesized in operation "S220" to each of the multiple beams (S230). At this time, the polarization allocation unit 330 allocates any one of the orthogonal polarization pairs to the reference beam signal according to the number of beams and the polarization component of the reference beam and allocates the other orthogonal polarization pair to beams adjacent to the reference beam signal.

Then, the RF unit 200 of the radio transmission and reception apparatus 10 frequency-converts each beam signal through the plurality of RF chains 210 (S240) and forms beams having different directivities through each antenna module 110 of the array antenna 100 (S250).

The radio transmission and reception apparatus 10 transmits and receives signals through the beams formed through the above operations. At this time, since each beam has both a different directivity and heterogeneous polarization components between adjacent beams, the correlation between the adjacent beams can be reduced, thereby increasing signal transmission and reception efficiency of the array antenna 100.

Although not illustrated in FIG. 18, when polarization synthesis is performed on the polarization components of the orthogonal polarization pairs allocated in operation "S230," an operation of correcting the magnitudes and phases of the multi-beam signals according to the magnitudes and phases of the signals of the RF chain 210 may be additionally performed before operation "S240." In this case, it is possible to form the beam in an accurate direction by preventing the direction of the polarization from being distorted during polarization synthesis.

Figure 19:
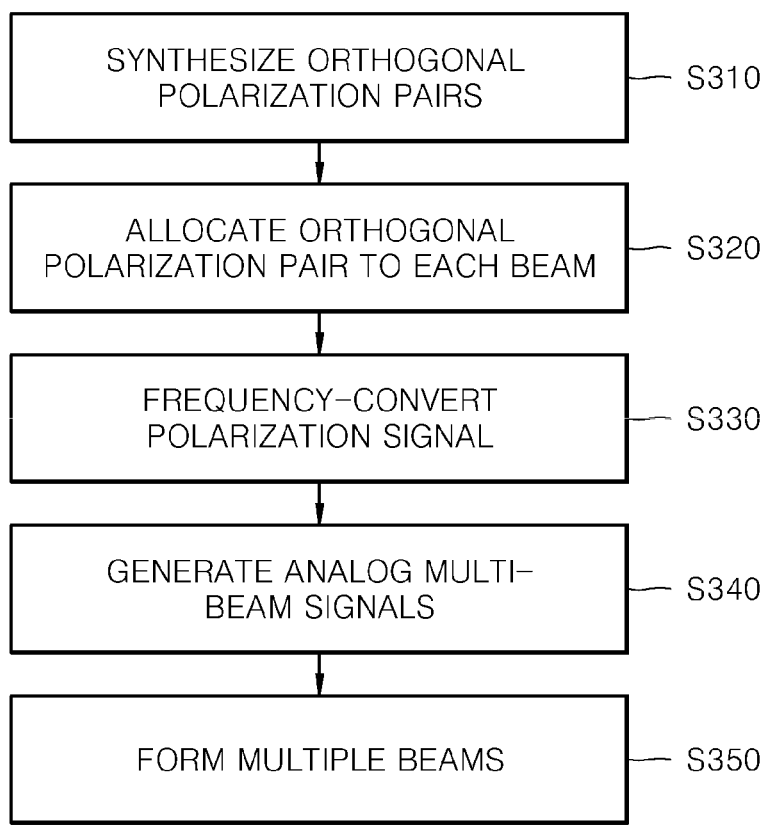
FIG. 19 is a view illustrating an operation flow of a beam forming method of the radio transmission and reception apparatus according to the third embodiment of the present disclosure.

FIG. 19 is a view illustrating a beam forming method of the radio transmission and reception apparatus according to the third embodiment of the present disclosure.

Referring to FIG. 19, the radio transmission and reception apparatus 10 according to the third embodiment has a structure in which the multi-beam forming unit is disposed at an analog stage of the RF unit 200 as illustrated in FIG. 15.

Therefore, the polarization synthesizing unit 320 of the radio transmission and reception apparatus 10 according to the third embodiment synthesizes the orthogonal polarization pairs to the streams of the input signals (S310). At this time, the radio transmission and reception apparatus 10 may synthesize two orthogonal polarization signals orthogonal to each other into one orthogonal polarization pair.

For example, the radio transmission and reception apparatus 10 extracts four polarization components, that is, the ±45 degree polarization components and the vertical/horizontal polarization components using a predefined matrix based on the input signals, synthesizes the ±45 degree polarization components orthogonal to each other among the extracted orthogonal components into one orthogonal polarization pair, and synthesizes the V/H polarization components into the other orthogonal polarization pair.

Then, the polarization allocation unit 330 of the radio transmission and reception apparatus 10 allocates the two orthogonal polarization pairs synthesized in operation "S310" to the multiple beams (S320). At this time, the polarization allocation unit 330 allocates any one of the orthogonal polarization pairs to the reference beam according to the number of beams and the polarization component of the reference beam and allocates the other orthogonal polarization pair to beams adjacent to the reference beam.

The RF unit 200 of the radio transmission and reception apparatus 10 frequency-converts the polarization signal for each beam to which the orthogonal polarization pair is allocated through the plurality of RF chains 210 (S330).

Then, the multi-beam forming unit of the radio transmission and reception apparatus 10 generates analog multi-beam signals by differently setting each of the phases of the signals of the orthogonal polarization pairs frequency-converted in operation "S330," (S340) and forms beams having different directivities through each antenna module 110 of the array antenna 100 (S350).

The radio transmission and reception apparatus 10 transmits and receives signals through the beams formed through the above operations. At this time, since each beam has both a different directivity and heterogeneous polarization components between adjacent beams, the correlation between the adjacent beams can be reduced, thereby increasing signal transmission and reception efficiency of the array antenna 100.

Although not illustrated in FIG. 19, when polarization synthesis is performed on the polarization components of the orthogonal polarization pairs allocated in operation "S320," an operation of correcting the magnitudes and phases of the polarization signals according to the magnitudes and phases of the signals of the RF chain 210 may be additionally performed before operation "S330." In this case, it is possible to form the beam in an accurate direction by preventing the direction of the polarization from being distorted during polarization synthesis.

The above description is merely the exemplary description of the technical spirit of the present disclosure, and those skilled in the art to which the present disclosure pertains will be able to variously modify and change the present disclosure without departing from the essential characteristics of the present disclosure.

Therefore, the embodiments disclosed in the present disclosure are not intended to limit the technical spirit of the present disclosure, but for describing it, and the scope of the technical spirit of the present disclosure is not limited by these embodiments. The scope of the present disclosure should be construed according to the appended claims, and all technical spirits within the equivalent range should be construed as being included in the scope of the present disclosure.

The invention claimed is:

1. A radio transmission and reception apparatus comprising:
    an array antenna configured to form multiple beams having different directivities and transmit and receive signals through the multiple beams;
    a digital unit configured to synthesize orthogonal polarization pairs and generate multi-beam signals for forming the multiple beams; and
    a radio frequency (RF) unit configured to frequency-convert the multi-beam signals and output each of the multi-beam signals to the array antenna,
    wherein the digital unit includes:
        a polarization synthesizing unit configured to synthesize the orthogonal polarization pairs from heterogeneous polarization signals;
        a polarization allocation unit configured to allocate the orthogonal polarization pairs to each of the multiple beams; and
        a polarization allocation control unit configured to generate a polarization allocation control signal for each of the multiple beams according to a number of multiple beams and a polarization component of a reference beam and provide the polarization allocation control signal to the polarization allocation unit.

2. The radio transmission and reception apparatus of claim 1, wherein each of the multiple beams has a different directivity in vertical and horizontal directions.

3. The radio transmission and reception apparatus of claim 1, wherein the digital unit further includes:
    a multi-beam forming unit configured to generate the multi-beam signals for forming the multiple beams in the array antenna based on the orthogonal polarization pair allocated to each of the multiple beams.

4. The radio transmission and reception apparatus of claim 1, wherein the polarization synthesizing unit is configured to convert polarization of an input signal into a first orthogonal polarization pair and a second orthogonal polarization pair.

5. The radio transmission and reception apparatus of claim 4, wherein the first orthogonal polarization pair is any one of a ±45 degree orthogonal polarization pair or a vertical/horizontal orthogonal polarization pair.

6. The radio transmission and reception apparatus of claim 4, wherein the second orthogonal polarization pair is the other of a ±45 degree orthogonal polarization pair or a vertical/horizontal orthogonal polarization pair.

7. The radio transmission and reception apparatus of claim 4, wherein the polarization allocation unit is configured to allocate the synthesized first orthogonal polarization pair and second orthogonal polarization pair to each of the multiple beams.

8. The radio transmission and reception apparatus of claim 7, wherein the polarization allocation unit is configured to allocate the first orthogonal polarization pair to a first beam among the multiple beams, and allocate the second orthogonal polarization pair to a second beam adjacent to the first beam.

9. The radio transmission and reception apparatus of claim 1, wherein the digital unit further includes a magnitude/phase correction unit configured to correct magnitudes and phases of the orthogonal polarization pairs allocated to the multi-beam signals.

10. The radio transmission and reception apparatus of claim 9, wherein the digital unit further includes a polarization synthesis calibration unit configured to compare the magnitudes and phases of the orthogonal polarization pairs allocated to the multi-beam signals during polarization synthesis with the magnitudes and phases of the RF chains of the RF unit to determine the correction of the magnitudes and phases, and output correction signals to the magnitude/phase correction unit.

11. The radio transmission and reception apparatus of claim 1, wherein:
the polarization synthesizing unit is configured to synthesize the multi-beam signals and the heterogeneous orthogonal polarization pairs; and
the polarization allocation unit is configured to allocate any one of the orthogonal polarization pairs synthesized to the multi-beam signals to each of the multiple beams.

12. A radio transmission and reception apparatus comprising:
an array antenna configured to form multiple beams having different directivities and transmit and receive signals through the multiple beams;
a digital unit configured to synthesize orthogonal polarization pairs to an input signal, allocate any one of the orthogonal polarization pairs to each of the multiple beams, and allocate heterogeneous orthogonal polarization pairs to adjacent beams among the multiple beams; and
an RF unit configured to frequency-convert a polarization signal of the orthogonal polarization pair allocated to each of the multiple beams, and set a phase of each polarization signal to output a beam signal to the array antenna,
wherein the RF unit includes;
a plurality of RF chains configured to convert a frequency of each polarization signal, and
a multi-beam forming unit configured to differently set the phase of each polarization signal to generate an analog multi-beam signal,
wherein the digital unit further includes a magnitude/phase correction unit configured to correct magnitudes and phases of the orthogonal polarization pairs allocated to each of the multi-beams.

13. The apparatus of claim 12, wherein the digital unit further includes a polarization synthesis calibration unit configured to compare magnitudes and phases of the orthogonal polarization pairs allocated to the multi-beam signals during polarization synthesis with magnitudes and phases of RF chains of the RF unit to determine correction of the magnitudes and phases, and output correction signals to the magnitude/phase correction unit.

14. The apparatus of claim 12, wherein the digital unit includes a multi-beam forming unit configured to generate multi-beam signals for forming the multiple beams in the array antenna based on the orthogonal polarization pair allocated to each of the multiple beams.

15. The apparatus of claim 12, wherein the digital unit further includes a polarization allocation control unit configured to generate a polarization allocation control signal for each of the multiple beams according to the number of multiple beams and a polarization component of a reference beam.

16. The apparatus of claim 12, wherein each of the multiple beams has a different directivity in vertical and horizontal directions.

17. A beam forming method of a radio transmission and reception apparatus, comprising:
synthesizing orthogonal polarization pairs and generating multi-beam signals for forming multiple beams;
frequency-converting the multi-beam signals through RF chains and outputting each of the multi-beam signals to an array antenna; and
forming multiple beams having different directivities from the multi-beam signals in the array antenna,
wherein, among the multiple beams, heterogeneous orthogonal polarization pairs are allocated to adjacent beams among the multiple beams, and phases of the orthogonal polarization pair allocated to each of the multiple beams are differently set,
wherein the method further comprises:
generating a polarization allocation control signal for each of the multiple beams according to a number of the multiple beams and a polarization component of a reference beam and providing the polarization allocation control signal to a polarization allocation unit.

18. The method of claim 17, wherein synthesizing orthogonal polarization pairs includes converting polarization of an input signal into a first orthogonal polarization pair and a second orthogonal polarization pair.

19. The method of claim 18, wherein the first orthogonal polarization pair is any one of a ±45 degree orthogonal polarization pair or a vertical/horizontal orthogonal polarization pair, and the second orthogonal polarization pair is the other of a ±45 degree orthogonal polarization pair or a vertical/horizontal orthogonal polarization pair.

20. The method of claim 17, further comprising correcting magnitudes and phases of the orthogonal polarization pairs allocated to the multi-beam signals.

* * * * *